United States Patent
Zakrzewski

(10) Patent No.: US 12,430,790 B2
(45) Date of Patent: Sep. 30, 2025

(54) SPATIAL SCANNING FOR EXTENDED REALITY

(71) Applicant: Snap Inc., Santa Monica, CA (US)

(72) Inventor: Tomasz Zakrzewski, Lachen (CH)

(73) Assignee: SNAP INC., Santa Monica, CA (US)

( * ) Notice: Subject to any disclaimer, the term of this patent is extended or adjusted under 35 U.S.C. 154(b) by 180 days.

(21) Appl. No.: 18/184,108

(22) Filed: Mar. 15, 2023

(65) Prior Publication Data

US 2024/0312044 A1  Sep. 19, 2024

(51) Int. Cl.
G06T 7/70 (2017.01)
G06T 7/50 (2017.01)
G06T 19/00 (2011.01)

(52) U.S. Cl.
CPC ............. *G06T 7/70* (2017.01); *G06T 7/50* (2017.01); *G06T 19/006* (2013.01); *G06T 2200/24* (2013.01); *G06T 2207/10016* (2013.01); *G06T 2210/21* (2013.01); *G06T 2219/004* (2013.01)

(58) Field of Classification Search
CPC ....... G06V 20/20; G06F 3/0346; G06F 3/012; G06F 3/011; G06T 7/70; G06T 7/50; G06T 19/006; G06T 2210/21; G06T 2207/10016; G06T 2200/24; G06T 2219/004; G06T 2210/04; G01B 11/2518; G01B 11/2513; H04N 23/58; H04N 2201/3245
See application file for complete search history.

(56) References Cited

U.S. PATENT DOCUMENTS

| | | | | |
|---|---|---|---|---|
| 2020/0111267 A1* | 4/2020 | Stauber | ................... | G06F 3/011 |
| 2020/0327690 A1* | 10/2020 | Cai | ............ | G06T 7/73 |
| 2021/0398338 A1* | 12/2021 | Philion | ................ | G06V 10/774 |
| 2022/0277472 A1* | 9/2022 | Birchfield | .............. | G06V 10/82 |
| 2023/0113647 A1* | 4/2023 | Zeng | ......................... | G06T 7/62 |
| | | | | 345/419 |
| 2023/0326215 A1* | 10/2023 | Yu | .......................... | G06V 20/58 |
| | | | | 701/28 |

FOREIGN PATENT DOCUMENTS

| WO | 2022190085 | 9/2022 |
|---|---|---|
| WO | 2024191911 | 9/2024 |

OTHER PUBLICATIONS

"International Application Serial No. PCT/US2024/019382, International Search Report mailed Jun. 13, 2024", 4 pgs.

"International Application Serial No. PCT/US2024/019382, Written Opinion mailed Jun. 13, 2024", 8 pgs.

\* cited by examiner

*Primary Examiner* — Xilin Guo

(74) *Attorney, Agent, or Firm* — SCHWEGMAN LUNDBERG & WOESSNER, P.A.

(57) ABSTRACT

An extended Reality (XR) system that provides services for determining 3D data of physical objects in a real-world scene. The XR system receives a request from an application to initiate a spatial scan of a real-world scene. In response, the XR system captures video frame data of the real-world scene and captures a pose of the XR system. The XR system determines a physical object in the real-world scene and determines a 2D position of the physical object, using the video frame data. The XR system determines a depth of the physical object using the 2D position and determines a 3D position of the physical object in the real-world scene using the 2D position of the physical object, the depth of the physical object, and the pose of the XR system. The XR (Continued)

system communicates the 3D position data to the application.

20 Claims, 12 Drawing Sheets

SPATIAL SCANNING FOR EXTENDED REALITY

TECHNICAL FIELD

The present disclosure relates generally to extended reality systems and more particularly to extended reality systems that provide services to other systems.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a two-dimensional (2D) or three-dimensional (3D) graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays that occlude the user's eyes. As used herein, the term extended Reality (XR) refers to augmented reality, virtual reality and any of hybrids of these technologies unless the context indicates otherwise.

Mobile devices may also be used to provide an XR experience to a user. One or more cameras of the mobile device capture video frame data of a real-world scene and displays the real-world scene along with a set of virtual objects to the user using a display screen of the mobile device.

A user of a head-wearable apparatus or a mobile device may access and use a computer software application to perform various tasks or engage in an entertaining activity. To use the computer software application, the user interacts with a user interface provided by the head-wearable apparatus or the mobile device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

XR systems display objects to a user viewing a real-world scene as if the virtual objects are located in the real-world scene. To achieve this effect, 3D positions, or anchor points, in a 3D coordinate system of the real-world scene are used to fix the virtual object in the real-world scene.

It is advantageous to associate anchor points with physical objects in the real-world scene. For example, by assigning an anchor point to a virtual object where the anchor point is on a surface of a table. When the virtual object is displayed, the virtual object appears as if it is on the surface of the table rather than floating in space.

Conventionally, 3D data of the real-world scene are operated on to detect physical objects whose 3D positions may be used as anchor points. Collection of the 3D data can be time consuming and operating directly on 3D data can be computationally intensive. Accordingly, a more lightweight method to detect physical objects and determine the 3D positions of the physical objects in a real-world scene is desirable.

In some examples, an extended Reality (XR) system provides services for determining 3D data of physical objects in a real-world scene. The XR system receives a request from an application to initiate a spatial scan of a real-world scene. In response, the XR system captures video frame data of the real-world scene and captures a pose of the XR system. The XR system determines a physical object in the real-world scene and determines a 2D position of the physical object using the video frame data. The XR system determines a distance of the physical object from a camera that captured the video frame data using the 2D position and depth data of a depth map, and determines a 3D position of the physical object in the real-world scene using the 2D position of the physical object, the distance of the physical object, and the pose of the XR system. The XR system communicates the 3D position data to the application.

In some examples, the identification of the physical object is performed by the XR system itself. In some examples, the XR system communicates the video frame data to an object identification service on another system to identify the physical object.

In some examples, the processes of performing the spatial scan are encapsulated in a service that is provided by the XR system to one or more applications.

In some examples, the XR system labels the physical object when the physical object is detected.

Other technical features may be readily apparent to one skilled in the art from the following figures, descriptions, and claims.

Head-Wearable Apparatus

Figure 1A:
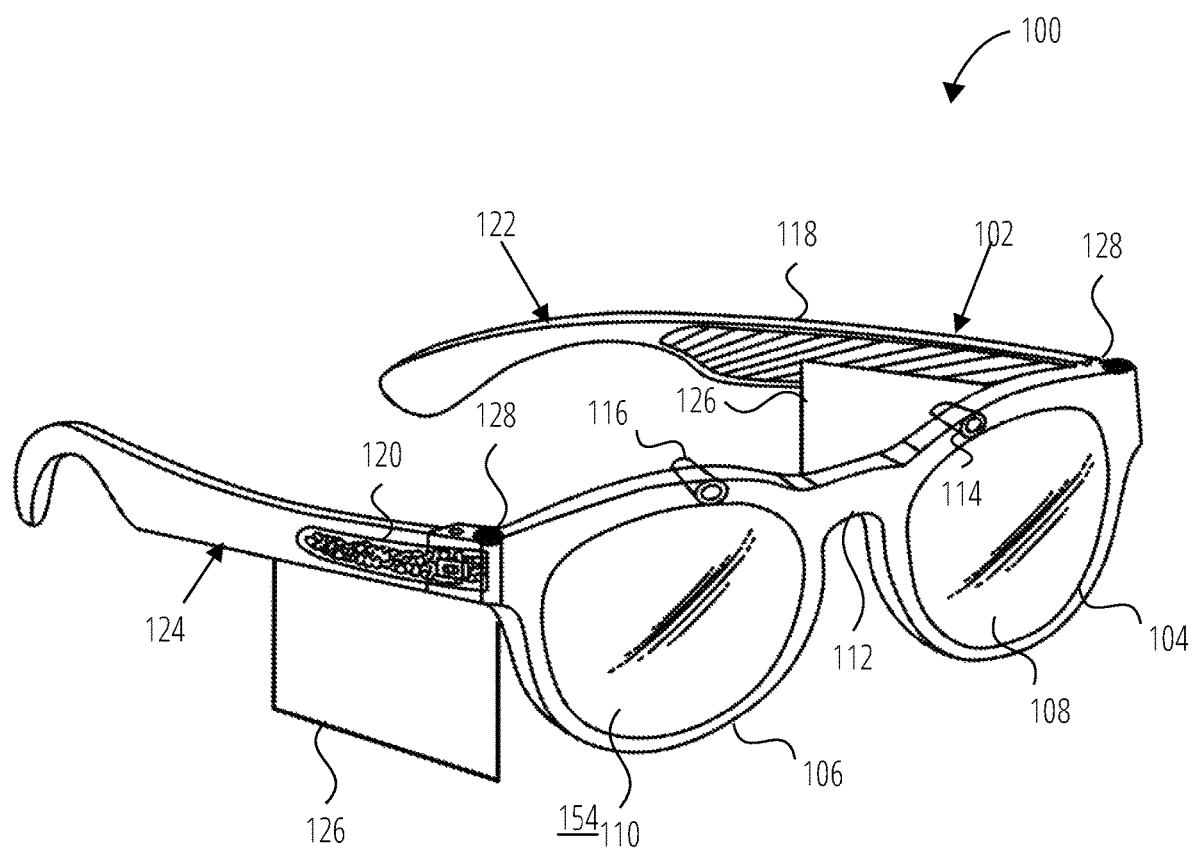
FIG. 1A is a perspective view of a head-wearable apparatus, in accordance with some examples.

FIG. 1A is a perspective view of an XR user device in a form of a head-wearable apparatus 100, in accordance with some examples. The head-wearable apparatus 100 may be a client device of an XR system, such as XR system 702 of FIG. 7 or the head-wearable apparatus 100 may be a stand-alone XR system. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 626, high-speed circuitry 628, and a display processor. Various other examples may include these elements in different configurations or integrated together in different ways. Additional details of aspects of the computer 120 may be implemented as illustrated by the machine 300 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth. For example, the biometric sensors may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The position sensors and motion sensors may include acceleration sensor components (e.g., accelerometer), gravitation sensor components, rotation sensor components (e.g., gyroscope), and the like. In some examples, the position sensors and motion sensors may be incorporated in an Inertial Motion Unit (IMU) or the like.

In some examples, the head-wearable apparatus 100 identifies its position and orientation in 3D space where the position and orientation taken together constitute a pose of the head-wearable apparatus 100. A pose is comprised of 6 values, 3 values for a position within a 3D Cartesian coordinate system having three orthogonal axis (a horizontal or X axis, a vertical or Y axis, and a depth or Z axis), and 3 values for a rotation around each respective axis (e.g., the Euler angles, such as ($\alpha$, $\beta$, $\gamma$), or pitch, yaw, and roll). The 6 values are compactly referred to as the 6D pose of the device. A pose tracking component (not shown) of the head-wearable apparatus 100 may comprise sensors and components such as, but not limited to, the right camera 116, the left camera 114, a Global Positioning System (GPS), an IMU, gravitometers, and the like, whose outputs are combined to track movement, orientation, and position of the head-wearable apparatus 100. The task of determining the pose of the head-wearable apparatus 100 is referred to as pose estimation.

In some examples, the pose tracking component tracks the pose of the mobile device 208 based on visual Simultaneous Location And Mapping (vSLAM) methodologies using the outputs of an IMU and one or more cameras of the mobile device 208.

During an XR experience, the head-wearable apparatus 100 may continuously estimate its pose in a 3D coordinate system. The position of the head-wearable apparatus 100 is measured by the positional displacement of the head-wearable apparatus 100 from the origin of the 3D coordinate system and the orientation is measured by the angular (rotational) displacement of the axes of the head-wearable apparatus 100 from the axes of the 3D coordinate system. The position is expressed by a set of points, e.g. cartesian coordinates, such as (x,y,z). The orientation is typically expressed by a set of rotation angles, e.g. the Euler angles, such as ($\alpha$, $\beta$, $\gamma$). Other parameterizations to express the rotational displacement may be used, such as quaternions or angle-axis representations. The pose may be expressed as a transformation matrix or mapping.

In some examples, the left camera 114 and the right camera 116 provide video frame data for use by the head-wearable apparatus 100 to extract 3D information from a real-world scene including depths, or displacement along the Z axis from the head-wearable apparatus 100.

The head-wearable apparatus 100 may also construct and maintain one or more 3D reference frames with each reference frame comprising a respective coordinate system. For example, the mobile device 208 may construct a local real-world scene reference frame, a global real-world reference frame, a reference frame associated to the head-wearable apparatus 100, and the like. Each reference frame may be associated with transformations that relate positions and orientations in the different reference systems. As an example, a depth measurement and a direction from the head-wearable apparatus 100 may be transformed into a local coordinate system of a local real-world scene reference frame to identify a location of a corresponding physical object in the real-world scene reference frame and coordinate system.

The head-wearable apparatus 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
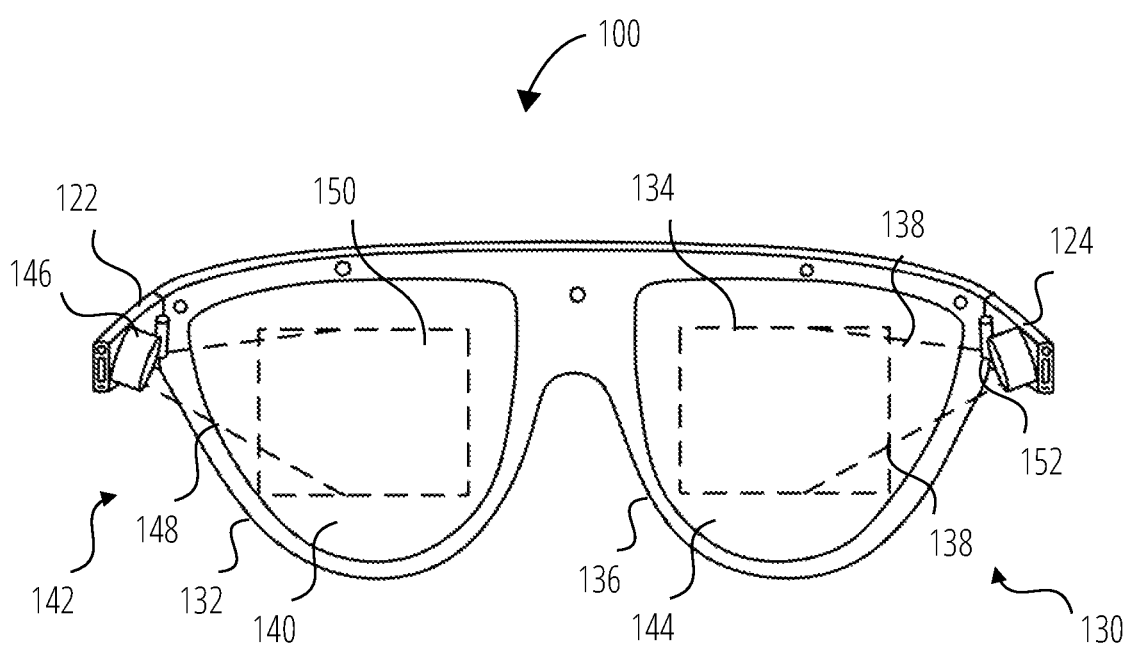
FIG. 1B is a further perspective view of the head-wearable apparatus of FIG. 1A, in accordance with some examples.

FIG. 1B illustrates the head-wearable apparatus 100 from the perspective of a user while wearing the head-wearable apparatus 100. For clarity, a number of the elements that are shown in FIG. 1A have been omitted in FIG. 1B. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated, however, that other display technologies or configurations may be utilized within an optical engine to display an image to a user in the user's field of view. For example, instead of a projector and a waveguide, an LCD, LED or other display panel or surface may be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 614 illustrated in FIG. 6), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Mobile Device

Figure 2B:
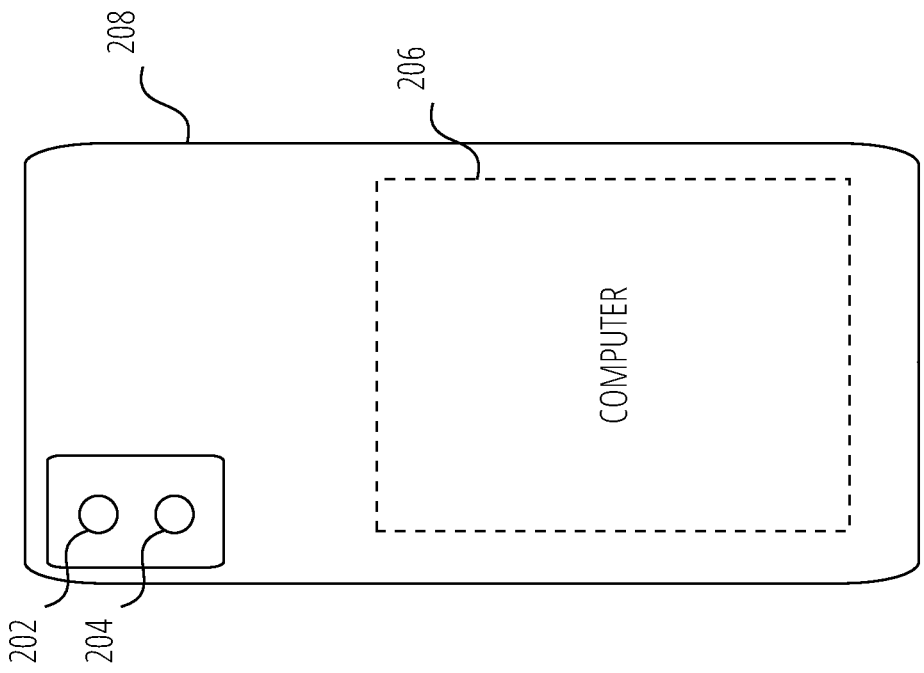
FIG. 2B is a rear view of a mobile device, in accordance with some examples.
Figure 2A:
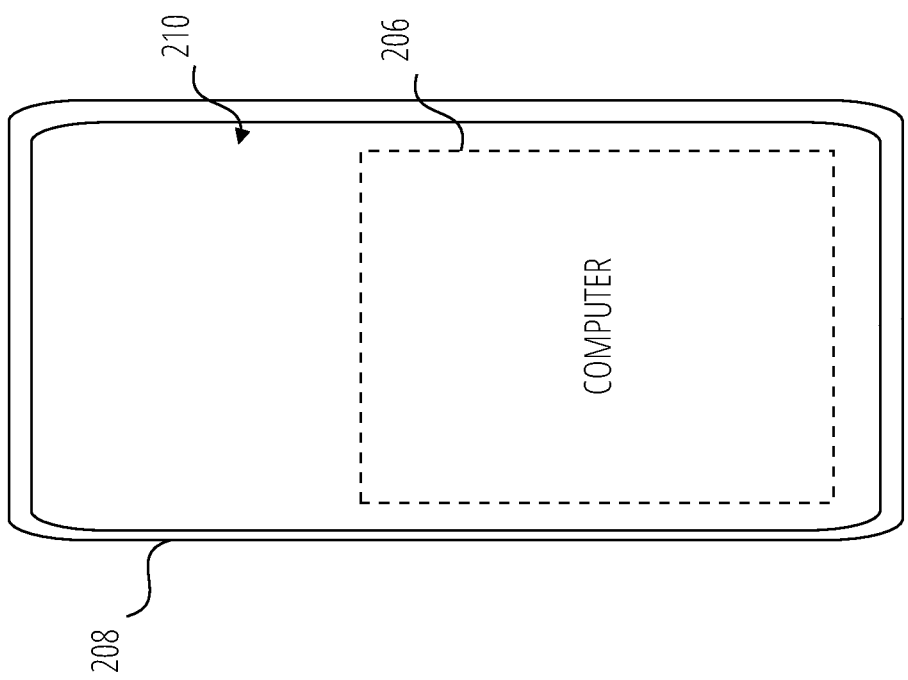
FIG. 2A is a front view of a mobile device, in accordance with some examples.

FIG. 2A is a front view of an XR user device in a form of a mobile device 208 and FIG. 2B is a rear view of the mobile device 208, in accordance with some examples. The mobile device 208 may be a smartphone, tablet computer, or the like. The mobile device 208 may be a client device of an XR system, such as XR system 702 of FIG. 7 or the mobile device 208 may be a stand-alone XR system. The mobile device 208 comprises a screen 210 constructed as a display for displaying images of an XR experience to a user. In some examples, the screen 210 is a touchscreen constructed to receive user inputs from the user. In some examples, the mobile device 208 comprises one or more physical input devices (not shown) such as, but not limited to, buttons, switches, and the like that are constructed to receive user inputs.

The mobile device 208 includes a computing device, such as a computer 206, which can be of any suitable type so as to be housed in the mobile device 208. The computer 206 can include one or more processors with memory, wireless communication circuitry, and a power source. Additional details of aspects of the computer 206 may be implemented as illustrated by the machine 300 discussed herein.

The mobile device 208 includes a first camera 202 and a second camera 204. Although two cameras are depicted, other examples contemplate the use of a single or additional (i.e., more than two) cameras. In some examples, the head-wearable apparatus 100 includes any number of input sensors or other input/output devices in addition to the first camera 202 and the second camera 204. Such sensors or input/output devices can additionally include biometric sensors, location sensors, motion sensors, and so forth.

In some examples, the mobile device 208 includes any number of input sensors or other input/output devices in addition to the first camera 202 and the second camera 204. Such sensors or input/output devices can additionally include biometric sensors, location sensors, motion sensors, and so forth. For example, the biometric sensors may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The position sensors and motion sensors may include acceleration sensor components (e.g., accelerometer), gravitation sensor components, rotation sensor components (e.g., gyroscope), and the like. In some examples, the position sensors and motion sensors may be incorporated in an IMU or the like.

In some examples, the mobile device 208 its position and orientation in 3D space where the position and orientation taken together constitute a pose of the mobile device 208. A pose is comprised of 6 values, 3 values for a position within a 3D Cartesian coordinate system having three orthogonal axis (a horizontal or X axis, a vertical or Y axis, and a depth or Z axis), and 3 values for a rotation around each respective axis (e.g., the Euler angles, such as ($\alpha$, $\beta$, $\gamma$), or pitch, yaw, and roll). The 6 values are compactly referred to as the 6D pose of the device. A pose tracking component (not shown) of the mobile device 208 may comprise sensors and components such as, but not limited to, the first camera 202, the second camera 204, a Global GPS, an IMU, gravitometers, and the like, whose outputs are combined to track movement, orientation, and position of the mobile device 208.

In some examples, the pose tracking component tracks the pose of the mobile device 208 based on vSLAM methodologies using the outputs of an IMU and one or more cameras of the mobile device 208.

During an XR experience, the mobile device 208 may continuously estimate its pose in a 3D coordinate system. The position of the head-wearable apparatus 100 is measured by the positional displacement of the mobile device 208 from the origin of the 3D coordinate system and the orientation is measured by the angular (rotational) displacement of the axes of the mobile device 208 from the axes of the 3D coordinate system. The position is expressed by a set of points, e.g. cartesian coordinates, such as (x,y,z). The orientation is typically expressed by a set of rotation angles, e.g. the Euler angles, such as ($\alpha$, $\beta$, $\gamma$). Other parameterizations to express the rotational displacement may be used, such as quaternions or angle-axis representations. The pose may be expressed as a transformation matrix or mapping.

In some examples, the first camera 202 and the second camera 204 provide video frame data for use by the mobile device 208 to extract 3D information from a real-world scene including depths, or displacement along the Z axis from the mobile device 208.

The mobile device 208 may also construct and maintain one or more 3D reference frames with each reference frame comprising a respective coordinate system. For example, the mobile device 208 may construct a local real-world scene reference frame, a global real-world reference frame, a reference frame associated to the mobile device 208, and the like. Each reference frame may be associated with transformations that relate positions and orientations in the different reference systems. As an example, a depth measurement and a direction from the mobile device 208 may be transformed into a local coordinate system of a local real-world scene reference frame to identify a location of a corresponding physical object in the real-world scene reference frame and coordinate system.

The combination of a Graphical Processing Unit (GPU), an image display driver, and the screen 210 provide an optical engine of the mobile device 208. The mobile device 208 uses the optical engine to generate an overlay of the real-world scene view of the user including display of a user interface to the user of the mobile device 208.

It will be appreciated, however, that other display technologies or configurations may be utilized within an optical engine to display an image to a user in the user's field of view. For example, an LCD, LED or other display panel or surface may be provided.

In use, a user of the mobile device 208 will be presented with information, content and various user interfaces on the screen 210. As described in more detail herein, the user can then interact with the mobile device 208 using methodologies and devices including, but not limited to, a touchscreen, a touchpad, a set of buttons and/or a set of switches, voice inputs, or touch inputs on an associated device and/or hand movements, locations, and positions recognized by the mobile device 208, and the like.

In some examples, the mobile device 208 comprises an XR system. In some examples, the mobile device 208 is a component of an XR system including additional computational components. In some examples, the mobile device 208 is a component in an XR system comprising additional user input systems or devices.

Machine Architecture

Figure 3:
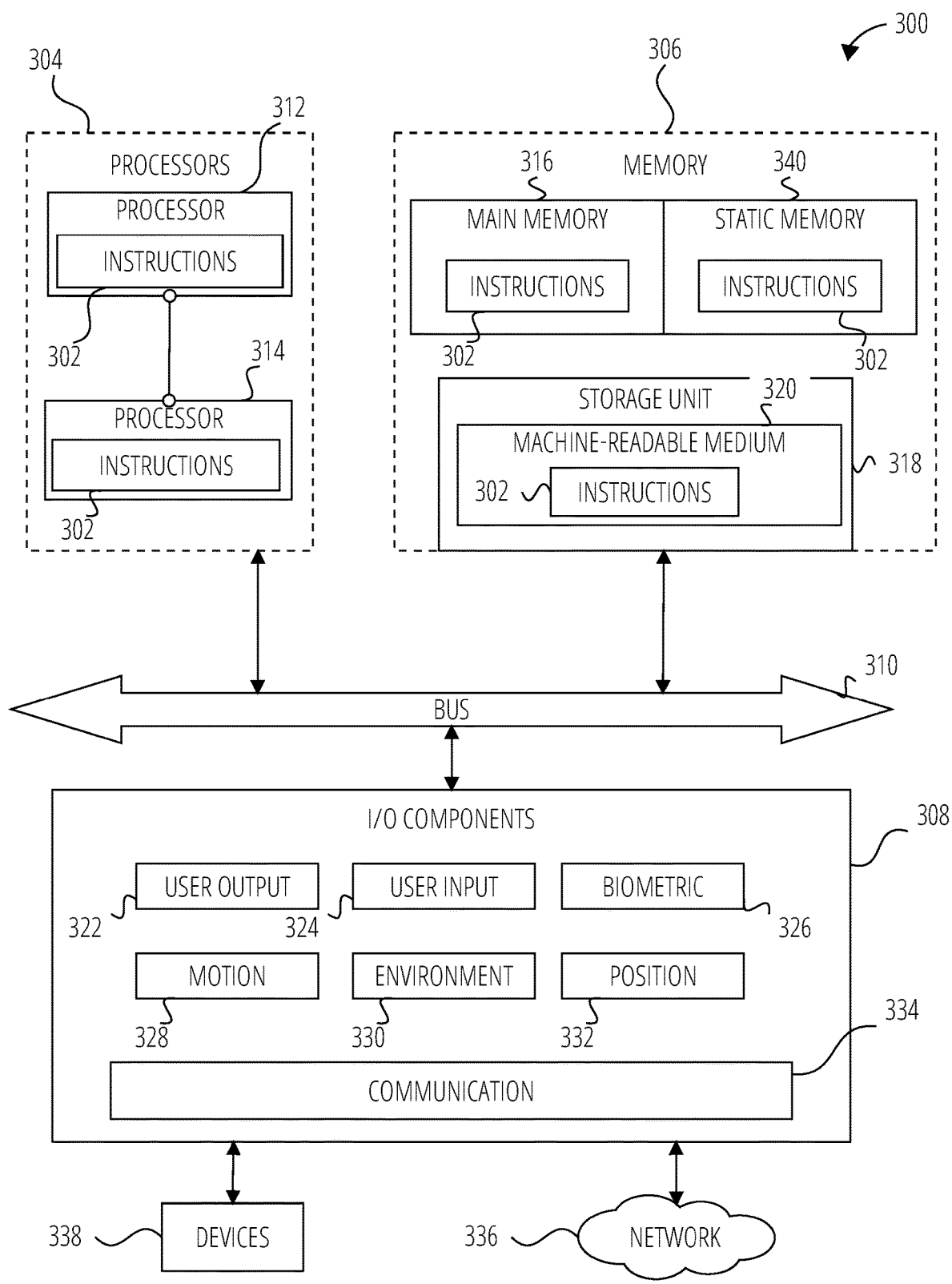
FIG. 3 is a diagrammatic representation of a machine in the form of a computer system within which a set of instructions may be executed to cause the machine to perform any one or more of the methodologies discussed herein, in accordance with some examples.

FIG. 3 is a diagrammatic representation of the machine 300 within which instructions 302 (e.g., software, a program, an application, an applet, an app, or other executable code) for causing the machine 300 to perform any one or more of the methodologies of a head-wearable apparatus or mobile device as discussed herein may be executed. For example, the instructions 302 may cause the machine 300 to execute any one or more of the methods described herein. The instructions 302 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 302, sequentially or otherwise, that specify actions to be taken by the machine 300. Further, while a single machine 300 is illustrated, the term "machine" shall also be taken to include a collection of machines that individually or jointly execute the instructions 302 to perform any one or more of the methodologies discussed herein. The machine 300, for example, may comprise the XR system 702 or any one of multiple server devices forming part of the interaction server system 712. In some examples, the machine 300 may also comprise both client and server systems, with certain operations of a particular method or algorithm being performed on the server-side and with certain operations of the particular method or algorithm being performed on the client-side.

The machine 300 may include processors 304, memory 306, and input/output I/O components 308, which may be configured to communicate with each other via a bus 310. In an example, the processors 304 (e.g., a Central Processing Unit (CPU), a Reduced Instruction Set Computing (RISC) Processor, a Complex Instruction Set Computing (CISC) Processor, a GPU, a Digital Signal Processor (DSP), an Application Specific Integrated Circuit (ASIC), a Radio-Frequency Integrated Circuit (RFIC), another processor, or any suitable combination thereof) may include, for example, a processor 312 and a processor 314 that execute the instructions 302. The term "processor" is intended to include multi-core processors that may comprise two or more independent processors (sometimes referred to as "cores") that may execute instructions contemporaneously. Although FIG. 3 shows multiple processors 304, the machine 300 may include a single processor with a single core, a single processor with multiple cores (e.g., a multi-core processor), multiple processors with a single core, multiple processors with multiples cores, or any combination thereof.

The memory 306 includes a main memory 316, a static memory 340, and a storage unit 318, both accessible to the processors 304 via the bus 310. The main memory 306, the static memory 340, and storage unit 318 store the instructions 302 embodying any one or more of the methodologies or functions described herein. The instructions 302 may also reside, completely or partially, within the main memory 316, within the static memory 340, within machine-readable medium 320 within the storage unit 318, within at least one of the processors 304 (e.g., within the processor's cache memory), or any suitable combination thereof, during execution thereof by the machine 300.

The I/O components 308 may include a wide variety of components to receive input, provide output, produce output, transmit information, exchange information, capture measurements, and so on. The specific I/O components 308 that are included in a particular machine will depend on the type of machine. For example, portable machines such as mobile phones may include a touch input device or other such input mechanisms, while a headless server machine will likely not include such a touch input device. It will be appreciated that the I/O components 308 may include many other components that are not shown in FIG. 3. In various examples, the I/O components 308 may include user output components 322 and user input components 324. The user output components 322 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 324 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The environmental components 330 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

The position components 332 and the motion components 328 include location sensor components (e.g., a GPS receiver component), altitude sensor components (e.g., altimeters or barometers that detect air pressure from which altitude may be derived), orientation sensor components (e.g., magnetometers), and the like. In some examples, the position components 332 and the motion components 328 may be incorporated in an IMU or the like.

The biometric components 326 may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

With respect to cameras, the machine 300 may have a camera system comprising, for example, front cameras on a front surface of a housing of the machine 300 and rear cameras on a rear surface of the housing of the machine 300. The front cameras may, for example, be used to capture still images and video of a user of the machine (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the XR system 702 may also include a 360° camera for capturing 360° photographs and videos.

Further, the camera system of the machine 300 may include dual rear cameras (e.g., a primary camera as well as a depth-sensing camera), or even triple, quad or penta rear camera configurations on the front and rear sides of the machine 300. These multiple cameras systems may include a wide camera, an ultra-wide camera, a telephoto camera, a macro camera, and a depth sensor, for example.

Communication may be implemented using a wide variety of technologies. The I/O components 308 further include communication components 334 operable to couple the machine 300 to a network 336 or devices 338 via respective coupling or connections. For example, the communication components 334 may include a network interface component or another suitable device to interface with the network 336. In further examples, the communication components 334 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 338 may be another machine or any of a wide variety of peripheral devices (e.g., a peripheral device coupled via a USB).

Moreover, the communication components 334 may detect identifiers or include components operable to detect identifiers. For example, the communication components 334 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 334, such as location via Internet Protocol (IP) geolocation, location via Wi-Fi® signal triangulation, location via detecting an NFC beacon signal that may indicate a particular location, and so forth.

The various memories (e.g., main memory 316, static memory 340, and memory of the processors 304) and storage unit 318 may store one or more sets of instructions and data structures (e.g., software) embodying or used by any one or more of the methodologies or functions described herein. These instructions (e.g., the instructions 302), when executed by processors 304, cause various operations to implement the disclosed examples.

The instructions 302 may be transmitted or received over the network 336, using a transmission medium, via a network interface device (e.g., a network interface component included in the communication components 334) and using any one of several well-known transfer protocols (e.g., hypertext transfer protocol (HTTP)). Similarly, the instructions 302 may be transmitted or received using a transmission medium via a coupling (e.g., a peer-to-peer coupling) to the devices 338.

Spatial Scanning

Figure 4A:
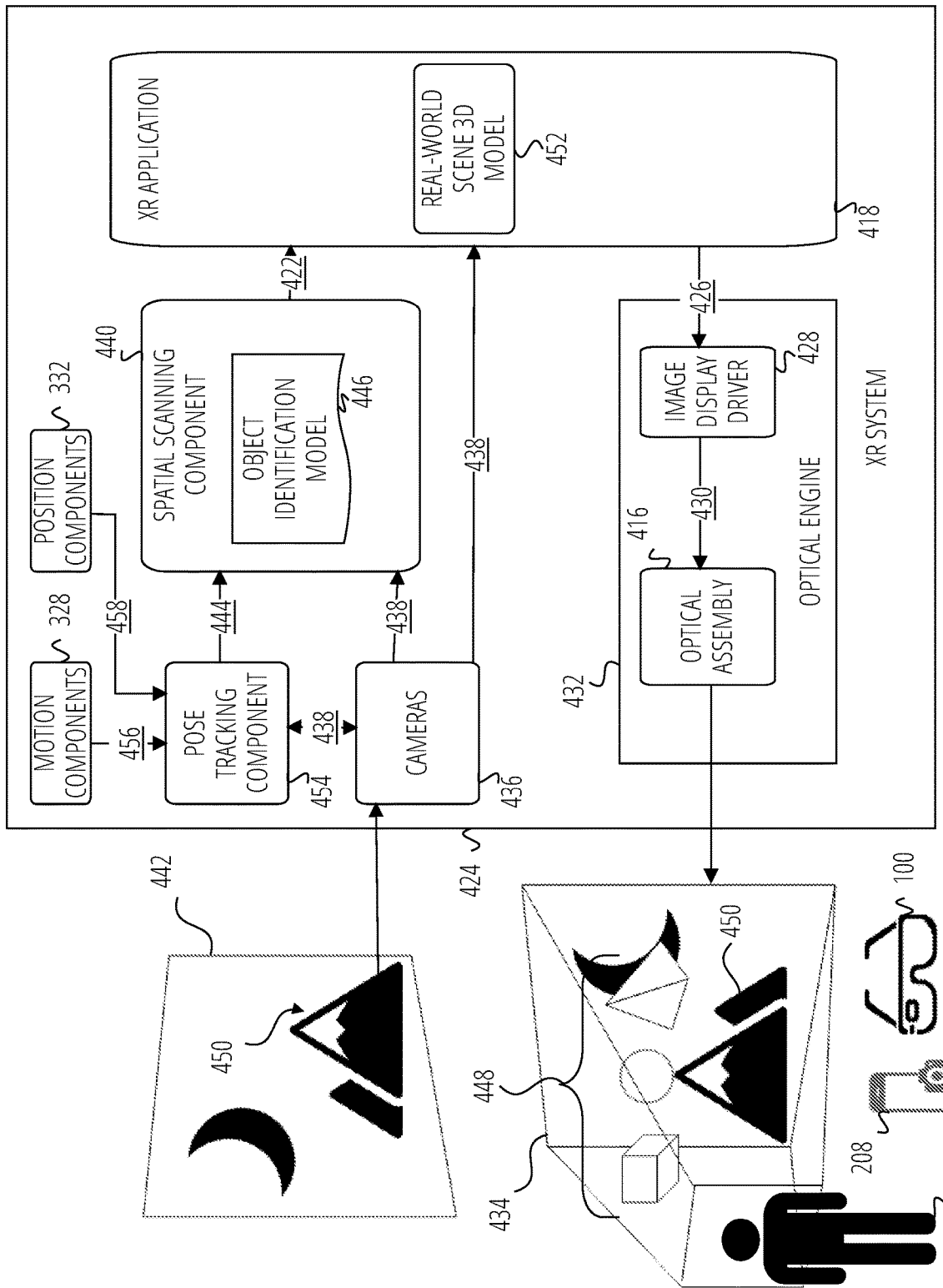
FIG. 4A is a collaboration diagram of components of an XR system, in accordance with some examples.
Figure 4B:
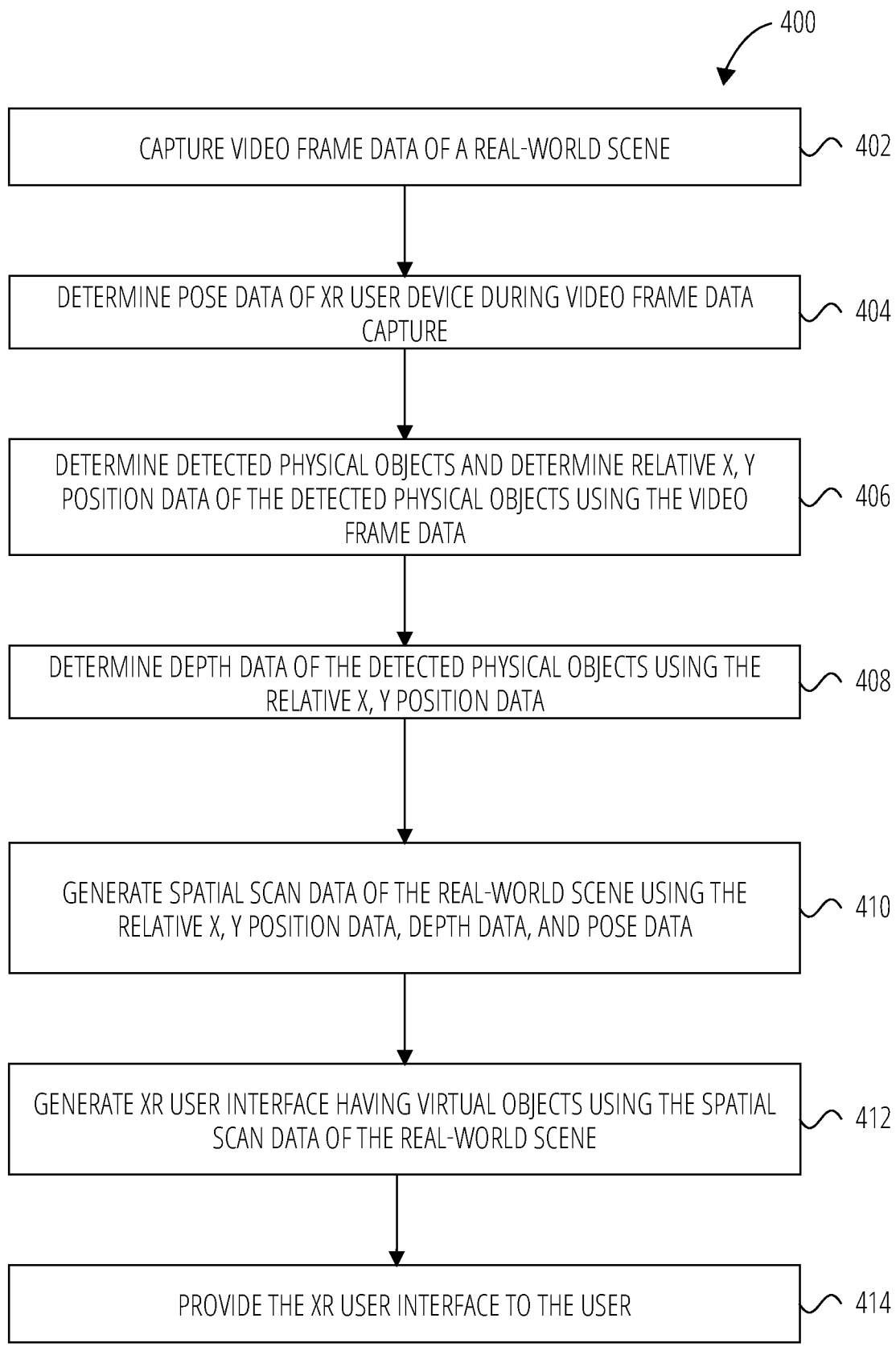
FIG. 4B is an activity diagram of a spatial scanning method, in accordance with some examples.

FIG. 4A is a collaboration diagram of components of an XR system 424 and FIG. 4B is a process flow diagram of a spatial scanning method 400 of the XR system 424, in accordance with some examples.

Although the spatial scanning method 400 depicts a particular sequence of operations, the sequence of operations may be altered without departing from the scope of the present disclosure. For example, some of the operations depicted may be performed in parallel, in a different sequence, or by different components of an XR system, without materially affecting the function of the method.

The spatial scanning method 400 is used by the XR system 424 to provide an XR user interface 434 to a user 420. The XR system 424 comprises an XR user device such as, but not limited to, a head-wearable apparatus 100, a mobile device 208, or the like. The XR system 424, provides an XR user interface 434 to the user 420 using the XR user device. The XR user interface 434 is generated by an XR application 418 of the XR system 424 that uses the services of the XR system 424 to perform a spatial scan of a real-world scene 442 including one or more physical objects 450. The XR application 418 may be a useful application such as an interactive game, maintenance guide, an interactive map, an interactive tour guide, a tutorial, or the like. The XR application 418 may also be an entertainment application such as a video game, an interactive video, or the like.

In operation 402, the XR application 418 sends a request to the XR system to initiate a spatial scan of the real-world scene 442. In response, the XR system 424 captures (first) video frame data 438 of the real-world scene 442. The one or more cameras 436 are mounted on the XR user device and capture the real-world scene 442 from a perspective of the user 420. For example, the XR system 424 uses the one or more cameras 436 of the XR system 424 to capture the video frame data 438 of the real-world scene 442. The one or more cameras 436 communicate the video frame data 438 to a spatial scanning component 440. The one or more cameras 436 also communicate the video frame data 438 to the XR application 418.

In operation 404, the XR system 424 captures pose data 444 of the XR user device as the XR system captures the video frame data 438 using the cameras 436 of the XR user device. The pose data 444 comprises a 6D pose of the XR user device including a position of the XR user device in a 3D coordinate system and a pitch angle, a yaw angle, and a roll angle of the XR user device in the real-world scene as the XR system captures the video frame data 438. For example, a pose tracking component 454 continuously receives motion data 456 and position data 458 from one or more motion components 328 and position components 332 (as more fully described in reference to FIG. 3) and the video frame data 438 from the one or more cameras 436 and generates pose data 444 using one or more of the motion data 456, position data 458, and video frame data 438 as more fully described in reference to FIG. 1A and FIG. 2A. At the request of the spatial scanning component 440, the pose tracking component 454 communicates the pose data 444 to the spatial scanning component 440.

In operation 406, the spatial scanning component 440 analyzes individual frames of the video frame data 438 to determine one or more detected physical objects of the real-world scene 442 and assign respective labels to the one or more detected physical objects. For example, the spatial scanning component 440 determines the one or more detected physical objects using artificial intelligence methodologies and an object identification model 446 that was previously generated using machine learning methodologies. In some examples, an object identification model 446 comprises, but is not limited to, a convolutional neural network, a learning vector quantization network, a logistic regression model, a support vector machine, a random decision forest, a naïve Bayes model, a linear discriminant analysis model, a K-nearest neighbor model, and the like. In some examples, machine learning methodologies used to generate the tracking model may include, but are not limited to, supervised learning, unsupervised learning, semi-supervised learning, reinforcement learning, dimensionality reduction, self-learning, feature learning, sparse dictionary learning, and anomaly detection.

For each detected physical object, the spatial scanning component 440 also determines a relative 2D position in a reference frame of the XR user device of the detected physical object in individual frames of the video frame data 438. The relative 2D position of the detected physical object comprises 2D X and Y coordinates of the detected physical object relative to the fields of view of the cameras 436 of the XR system 424 when the XR system 424 captured the video frame data. In some examples, the 2D X and Y coordinates of the 2D position are in the 3D coordinate system of the reference frame of the XR user device as defined on a plane of a display device of the XR user device such as, but not limited to, an optical element of a head-wearable apparatus 100 being worn by the user 420 or a screen of a mobile device 208 being held by the user 420.

For each detected physical object, the spatial scanning component 440 assigns metadata to the detected physical object such as, but not limited to, data of the relative 2D position of the detected physical object within the fields of view of the cameras 436, a label or identifier of the detected physical object, a confidence value of the identification of the detected physical object, and the like.

In operation 408, the spatial scanning component 440 determines a depth relative to the XR user device for each detected physical object of the detected physical objects. A depth is the distance from the XR user device and a physical object in the field of view of the one or more cameras 436 of the XR system that are mounted on the XR user device. For example, the one or more cameras 436 may comprise two or more cameras displaced from each other by known distances on the XR user device. Accordingly, the XR system can determine depth data for physical objects captured by the two or more cameras based on stereoscopic methodologies using additional (second) video frame data 438 and the known distances between the two or more cameras. The spatial scanning component 440 uses the relative 2D positions of the detected physical objects to determine portions of the video frame data 438 corresponding to the 2D positions to analyze when determining the depth data for respective detected physical objects. In some examples, the XR user device may include a depth determination sensor, such as a Light Detection And Ranging (LiDAR) sensor or the like, to determine the depth data. In some examples, the spatial scanning component 440 determines depth data for a detected physical object by casting a geometric ray from a point of view of the user 420 through the 2D position of the detected physical object as the physical object were displayed on a display device of the XR user device, such as an optical element of the head-wearable apparatus 100 or a display screen of the mobile device 208, or the like. The geometric ray is cast from the point of view of the user 420, through the 2D position on the display device, to the detected physical object in the real-world scene 442. The 3D coordinates of an intersection point of the cast geometric ray and the detected physical object constitute a 3D position of the detected physical object in the 3D coordinate system of the real-world scene 442.

In some examples, the depth data is maintained by the XR system in a depth map that is local to the XR system. In some examples, an XR system uses a single camera and pose data of the camera to build a depth map using successive images captured by the single camera at respective successive and different poses of the camera.

In operation 410, the spatial scanning component 440 finishes the spatial scan by generating spatial scan data 422 using the pose data 444, and the data of the detected physical objects. For example, the pose data 444 comprise a 6D pose of the XR user device being used by the user 420, and thus a 3D position of the XR user device relative to an origin point of the 3D coordinate system of the real-world scene 442 during the spatial scan.

For each detected physical object of the detected physical objects, the spatial scanning component 440 generates a relative vector or ray extending from the XR user device to the detected physical object using the relative 2D X and Y coordinate values determined for the detected physical object and the depth, or Z, coordinate value of the detected physical object determined using the video frame data 438 based on stereoscopic methodologies.

The spatial scanning component 440 determines X, Y, and Z coordinate values for a 3D position of the detected physical object in the 3D coordinate system of the real-world scene 442 relative to the origin point of the real-world scene 442 using the relative vector and the pose data 444 by adding the relative vector to the 3D position of the XR user device captured in the pose data 444 as the XR user device captured the video frame data 438. Accordingly, the spatial scan data 422 comprises a 3D position, a label, and a confidence value for each detected physical object of the detected physical objects. The spatial scanning component 440 communicates the spatial scan data 422 to the XR application 418.

In some examples, the spatial scanning component 440 captures additional (second) pose data for the XR user device during the determination of the depth data of the detected physical objects. The additional pose data 444 and the original (first) pose data 444 (first pose data) captured at the initiation of the spatial scan are used to compensate for movement of the XR user device during the determination of the detected physical objects and the determination of the depth data of the detected physical objects. For example, the spatial scanning component 440 determines a transformation using the additional pose data and the original pose data and the transformation is applied to the position data of the detected physical objects. In some examples, the transformation is applied to the 2D position data of the detected physical objects generated by the object identification model 446 before the spatial scanning component 440 determines the depth data. In some examples, the transformation is applied to the 3D position data of the detected physical objects generated by the spatial scanning component 440 using the 2D position data of the detected physical objects and the depth data of the detected physical objects.

In operation 412, the XR application 418 generates an XR user interface 434 containing virtual objects 448 provided to the user 420 in the context of the XR user interface 434. For example, the XR application 418 uses the spatial scan data 422 to generate a real-world scene 3D model 452 comprising the 3D positions of the detected physical objects in the real-world scene 442. The real-world scene 3D model 452 is a 3D model of a volume of space in the real-world scene 442 in which virtual objects 448 will be displayed to the user 420. The real-world scene 3D model 452 includes 3D position data of the virtual objects 448. When generating the virtual objects 448, the XR application 418 uses the 3D positions of the detected physical objects of the real-world scene 3D model 452 to determine 3D anchor points within the real-world scene 442 that are used to set the 3D positions of the virtual objects 448 in the XR user interface 434 relative to the detected physical objects of the real-world scene 442. By doing so, the virtual objects 448 appear to the user 420 as if the virtual objects 448 are fixed physical objects in the real-world scene 442. The virtual objects 448 are provided to the user in a binocular display such that the user 420 perceives the virtual objects 448 as being positioned in the real-world scene 442 at the 3D anchor points.

In operation 414, the XR application 418 generates XR user interface graphics data 426 using the real-world scene 3D model 452 and communicates the XR user interface graphics data 426 to an image display driver 428 of an optical engine 432 of the XR system 424. The image display driver 428 receives the XR user interface graphics data 426 and generates display control signals 430 using the XR user interface graphics data 426. The image display driver 428 uses the display control signals 430 to control the operations of an optical assembly 416 of the optical engine 432. In response to the display control signals 430, the optical assembly 416 generates visible images of the XR user interface 434 including a rendered image of the virtual objects 448 and the visible images are provided to the user 420.

In some examples, the object identification model 446 identifies physical features of the real-world scene 442 that are not complete physical objects, such as a floor surface of a room, an inside corner of a room, an outside corner of a building, a tabletop of a table that is not fully framed in a the video frame data 438, and the like. The detected physical features of the real-world scene 442 may be used for the same purposes as detected physical objects of the real-world scene by the XR system 424.

Spatial Scan Service

Figure 5:
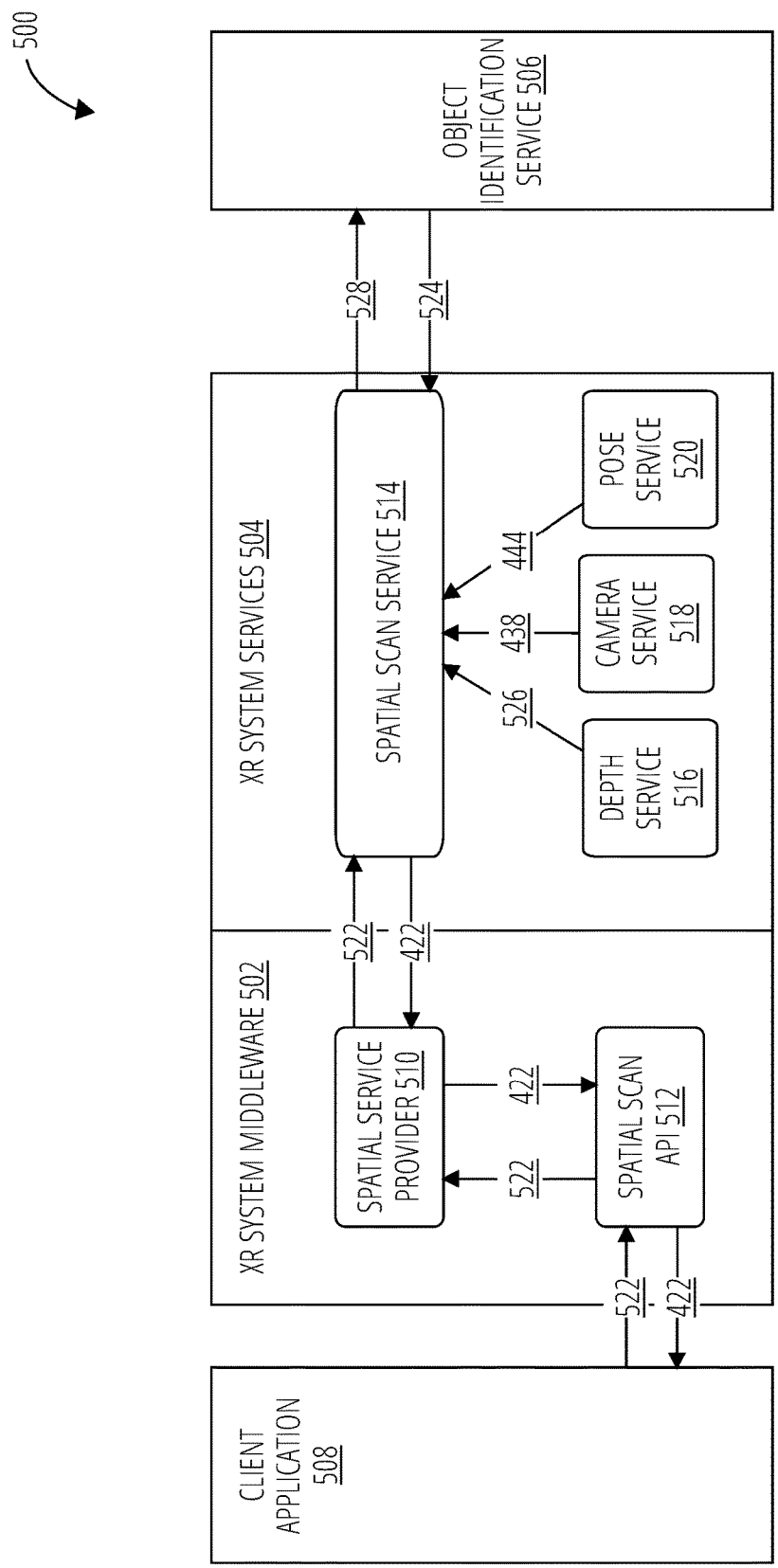
FIG. 5 is a collaboration diagram of a spatial scan service system, in accordance with some examples.

FIG. 5 is a collaboration diagram of a spatial scan service system 500 of an XR system, in accordance with some examples. The XR system provides spatial scanning as a service to a client application 508. In some examples, the client application 508 is hosted by the XR system, such as XR application 418 of FIG. 4A. In some examples, the client application 508 may be an application hosted by a system other than the XR system.

The spatial scan service system 500 comprises XR system middleware 502 comprising a spatial service provider 510 and a spatial scan Application Programing Interface (API) 512. The XR system middleware 502 provides an interface into one or more XR system services 504 of the XR system. The XR system services 504 comprise a spatial scan service 514 that performs the operations of a spatial scanning component 440 (of FIG. 4A), a pose service 520 that performs the operations of a Motion components 328 (of FIG. 4A), a camera service 518 that performs the operations of one or more cameras 436 of (FIG. 4A) and a depth service 516 that performs the operations of determining depth data for one or more detected physical objects as described in reference to FIG. 4A and FIG. 4B. In some examples, the XR system services 504 further comprise an object identification service 506 that performs operations of detecting and labeling physical objects using an object identification model 446 (of FIG. 4A) as described in reference to FIG. 4A and FIG. 4B. In some examples, the object identification service 506 is hosted by the XR system. In some examples, the object identification service 506 is hosted by a system external to the XR system.

During operation, the client application 508 communicates a spatial scan request 522 for performing a spatial scan of a real-world scene, such as real-world scene 442 (of FIG. 4A). The spatial scan API 512 receives the spatial scan request 522 and forwards the spatial scan request 522 to a spatial service provider 510. The spatial service provider 510 receives the spatial scan request 522 and communicates the spatial scan request 522 to the spatial scan service 514.

Upon receiving the spatial scan request 522 request, the spatial scan service 514 requests video frame data 438 from the camera service 518 controlling the one or more cameras 436. The spatial scan service 514 also requests pose data 444 from the pose service 520 for the 3D position of an XR user device housing the one or more cameras 436 as the cameras 436 capture the video frame data 438.

The spatial scan service 514 communicates an object identification request 528 to the object identification service 506. The object identification request 528 includes the video frame data 438 received from the camera service 518.

The object identification service 506 receives the object identification request 528 including the video frame data 438 and generates detected physical object data 524 of physical objects detected in the video frame data 438 as more fully described in reference to FIG. 4A and FIG. 4B. The object identification service 506 communicates the detected physical object data 524 to the spatial scan service 514. In some examples, the object identification service 506 executes in the backend on a server that is not a component of the XR system that hosts the XR system services 504. This approach allows for using more advanced object identification models at a lower power and thermal price to the XR system, but results in a higher latency coming from using a network to access the object identification service 506. In some examples, the object identification service 506 executes on the XR system. This approach is more expensive in terms of power and thermal management and the object identification models may be smaller and hence less capable, but at the same time the object identification service 506 is independent of network access and has a lower latency.

The spatial scan service 514 receives the detected physical object data 524 and requests depth data 526 for the detected physical objects in the detected physical object data 524 from the depth service 516. The depth service 516 determines the depth data 526 as more fully described in reference to FIG. 4A and FIG. 4B and communicates the depth data 526 to the spatial scan service 514.

The spatial scan service 514 receives the detected physical object data 524 and generates spatial scan data 422 as more fully described in reference to FIG. 4A and FIG. 4B. The spatial scan service 514 returns the spatial scan data 422 to the 508 via the spatial service provider 510 and the spatial scan API 512.

In some examples, the spatial scan service 514 requests additional pose data from the pose service 520 and uses the additional pose data to correct the spatial scan data 422 for movement of the XR system during the time that the object identification service 506 is detecting the detected physical objects and the depth service 516 is determining depth data for the detected physical objects as more fully described in reference to FIG. 4A and FIG. 4B.

In some examples, the client application 508 calls a 'StartSpatialScan' endpoint of the spatial scan API 512 to initiate a spatial scan, and to register one or more callbacks including an onSpatialScanResult called when a scan successfully completes that carries the resulting spatial scan data 422, and an onSpatialScanError called when the spatial scan cannot successfully be completed.

Systems

Figure 6:
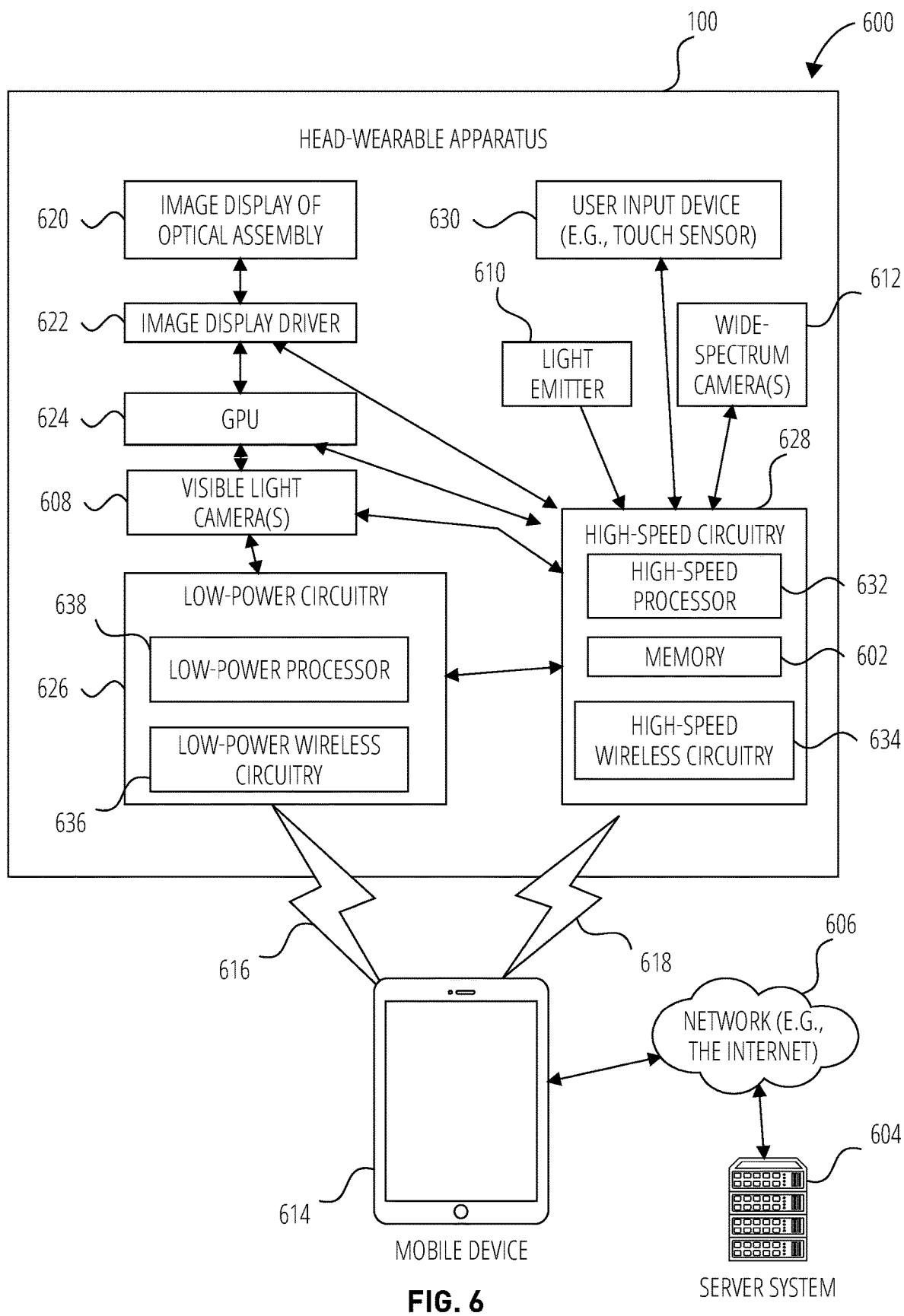
FIG. 6 illustrates a system of a head-wearable apparatus, in accordance with some examples.

FIG. 6 illustrates a system 600 including a head-wearable apparatus 100, according to some examples. FIG. 6 is a high-level functional block diagram of an example head-wearable apparatus 100 communicatively coupled to a mobile device 614 and various server systems 604 (e.g., the interaction server system 712) via various networks 710.

The head-wearable apparatus 100 includes one or more cameras, each of which may be, for example, one or more camera 608, a light emitter 610, and one or more wide-spectrum cameras 612.

The mobile device 614 connects with head-wearable apparatus 100 using both a low-power wireless connection 616 and a high-speed wireless connection 618. The mobile device 614 is also connected to the server system 604 and the network 606.

The head-wearable apparatus 100 further includes two image displays of the image display of optical assembly 620. The two image displays of optical assembly 620 include one associated with the left lateral side and one associated with the right lateral side of the head-wearable apparatus 100. The head-wearable apparatus 100 also includes an image display driver 622, and a GPU 624. The image display of optical assembly 620, image display driver 622, and GPU 624 constitute an optical engine of the head-wearable apparatus 100. The image display of optical assembly 620 is for presenting images and videos, including an image that can include a graphical user interface to a user of the head-wearable apparatus 100.

The image display driver 622 commands and controls the image display of optical assembly 620. The image display driver 622 may deliver image data directly to the image display of optical assembly 620 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 630 (e.g., touch sensor or push button), including an input surface on the head-wearable apparatus 100. The user input device 630 (e.g., touch sensor or push button) is to receive from the user an input selection to manipulate the graphical user interface of the presented image.

The components shown in FIG. 6 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 608 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 602, which stores instructions to perform a subset or all of the functions described herein. The memory 602 can also include storage device.

As shown in FIG. 6, the high-speed circuitry 628 includes a high-speed processor 632, a memory 602, and high-speed wireless circuitry 634. In some examples, the image display driver 622 is coupled to the high-speed circuitry 628 and operated by the high-speed processor 632 in order to drive the left and right image displays of the image display of optical assembly 620. The high-speed processor 632 may be any processor capable of managing high-speed communications and operation of any general computing system needed for the head-wearable apparatus 100. The high-speed processor 632 includes processing resources needed for managing high-speed data transfers on a high-speed wireless connection 618 to a wireless local area network (WLAN) using the high-speed wireless circuitry 634. In certain examples, the high-speed processor 632 executes an operating system such as a LINUX operating system or other such operating system of the head-wearable apparatus 100, and the operating system is stored in the memory 602 for execution. In addition to any other responsibilities, the high-speed processor 632 executing a software architecture for the head-wearable apparatus 100 is used to manage data transfers with high-speed wireless circuitry 634. In certain examples, the high-speed wireless circuitry 634 is configured to implement Institute of Electrical and Electronic Engineers (IEEE) 802.11 communication standards, also referred to herein as WiFi. In some examples, other high-speed communications standards may be implemented by the high-speed wireless circuitry 634.

The low-power wireless circuitry 636 and the high-speed wireless circuitry 634 of the head-wearable apparatus 100 can include short-range transceivers (Bluetooth™) and wireless wide, local, or wide area network transceivers (e.g., cellular or WiFi). Mobile device 614, including the transceivers communicating via the low-power wireless connection 616 and the high-speed wireless connection 618, may be implemented using details of the architecture of the head-wearable apparatus 100, as can other elements of the network 606.

The memory 602 includes any storage device capable of storing various data and applications, including, among other things, camera data generated by the left and right cameras 608, the wide-spectrum cameras 612, and the GPU 624, as well as images generated for display by the image display driver 622 on the image displays of the image display of optical assembly 620. While the memory 602 is shown as integrated with high-speed circuitry 628, in some examples, the memory 602 may be an independent standalone element of the head-wearable apparatus 100. In certain such examples, electrical routing lines may provide a connection through a chip that includes the high-speed processor 632 from the GPU 624 or the low-power processor 638 to the memory 602. In some examples, the high-speed processor 632 may manage addressing of the memory 602 such that the low-power processor 638 will boot the high-speed processor 632 any time that a read or write operation involving memory 602 is needed.

As shown in FIG. 6, the low-power processor 638 or high-speed processor 632 of the head-wearable apparatus 100 can be coupled to the camera (camera 608, light emitter 610, or wide-spectrum cameras 612), the image display driver 622, the user input device 630 (e.g., touch sensor or push button), and the memory 602.

The head-wearable apparatus 100 is connected to a host computer. For example, the head-wearable apparatus 100 is paired with the mobile device 614 via the high-speed wireless connection 618 or connected to the server system 604 via the network 606. The server system 604 may be one or more computing devices as part of a service or network computing system, for example, that includes a processor, a memory, and network communication interface to communicate over the network 606 with the mobile device 614 and the head-wearable apparatus 100.

The mobile device 614 includes a processor and a network communication interface coupled to the processor. The network communication interface allows for communication over the network 606, low-power wireless connection 616, or high-speed wireless connection 618. Mobile device 614 can further store at least portions of the instructions for generating binaural audio content in the mobile device 614's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 622. The output components of the head-wearable apparatus 100 further include acoustic components (e.g., speakers), haptic components (e.g., a vibratory motor), other signal generators, and so forth. The input components of the head-wearable apparatus 100, the mobile device 614, and server system 604, such as the user input device 630, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 616 and high-speed wireless connection 618 from the mobile device 614 via the low-power wireless circuitry 636 or high-speed wireless circuitry 634.

Networked Computing Environment

Figure 7:
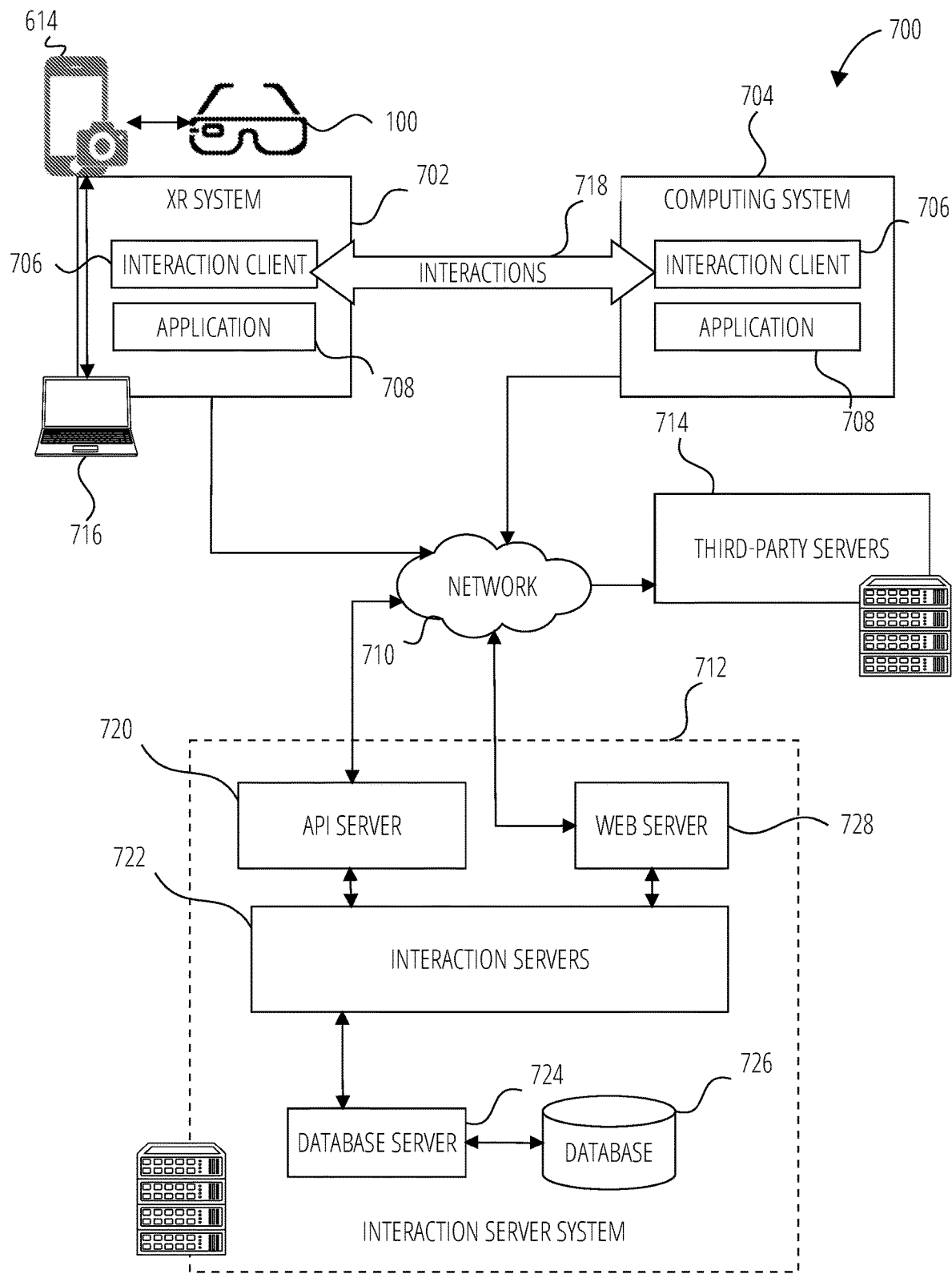
FIG. 7 is a collaboration diagram of a networked environment in which the present disclosure may be deployed, in accordance with some examples.

FIG. 7 is a block diagram showing an example interaction system 700 for facilitating interactions (e.g., exchanging text messages, conducting text audio and video calls, or playing games) over a network. The interaction system 700 includes one or more XR systems, such as XR computing system 702, each of which hosts multiple applications, including an interaction client 706 and other applications 708. Each interaction client 706 is communicatively coupled, via one or more communication networks including a network 710 (e.g., the Internet), to other instances of the interaction client 706 (e.g., hosted on respective other computing systems such as computing system 704), an interaction server system 712 and third-party servers 714). An interaction client 706 can also communicate with locally hosted applications 708 using Applications Program Interfaces (APIs).

Each XR system 702 may comprise one or more user devices, such as a mobile device 614, head-wearable apparatus 100, and a computer client device 716 that are communicatively connected to exchange data and messages.

An interaction client 706 interacts with other interaction clients 706 and with the interaction server system 712 via the network 710. The data exchanged between the interaction clients 706 (e.g., interactions 718) and between the interaction clients 706 and the interaction server system 712 includes functions (e.g., commands to invoke functions) and payload data (e.g., text, audio, video, or other multimedia data).

The interaction server system 712 provides server-side functionality via the network 710 to the interaction clients 706. While certain functions of the interaction system 700 are described herein as being performed by either an interaction client 706 or by the interaction server system 712, the location of certain functionality either within the interaction client 706 or the interaction server system 712 may be a design choice. For example, it may be technically preferable to initially deploy particular technology and functionality within the interaction server system 712 but to later migrate this technology and functionality to the interaction client 706 where an XR system 702 has sufficient processing capacity.

The interaction server system 712 supports various services and operations that are provided to the interaction clients 706. Such operations include transmitting data to, receiving data from, and processing data generated by the interaction clients 706. This data may include message content, client device information, geolocation information, media augmentation and overlays, message content persistence conditions, social network information, and live event information. Data exchanges within the interaction system 700 are invoked and controlled through functions available via user interfaces (UIs) of the interaction clients 706.

Turning now specifically to the interaction server system 712, an Application Program Interface (API) server 720 is coupled to and provides programmatic interfaces to Interaction servers 722, making the functions of the Interaction servers 722 accessible to interaction clients 706, other applications 708 and third-party server 714. The Interaction servers 722 are communicatively coupled to a database server 724, facilitating access to a database 726 that stores data associated with interactions processed by the Interaction servers 722. Similarly, a web server 728 is coupled to the Interaction servers 722 and provides web-based interfaces to the Interaction servers 722. To this end, the web server 728 processes incoming network requests over the Hypertext Transfer Protocol (HTTP) and several other related protocols.

The Application Program Interface (API) server 720 receives and transmits interaction data (e.g., commands and message payloads) between the interaction servers 722 and the XR system 702 (and, for example, interaction clients 706 and other applications 708) and the third-party server 714. Specifically, the Application Program Interface (API) server 720 provides a set of interfaces (e.g., routines and protocols) that can be called or queried by the interaction client 706 and other applications 708 to invoke functionality of the interaction servers 722. The Application Program Interface (API) server 720 exposes various functions supported by the interaction servers 722, including account registration; login functionality; the sending of interaction data, via the interaction servers 722, from a particular interaction client 706 to another interaction client 706; the communication of media files (e.g., images or video) from an interaction client 706 to the interaction servers 722; the settings of a collection of media data (e.g., a story); the retrieval of a list of friends of a user of an XR system 702; the retrieval of messages and content; the addition and deletion of entities (e.g., friends) to an entity graph (e.g., a social graph); the location of friends within a social graph; and opening an application event (e.g., relating to the interaction client 706).

The interaction servers 722 host multiple systems and subsystems, described below with reference to FIG. 9. Returning to the interaction client 706, features and functions of an external resource (e.g., a linked application 708 or applet) are made available to a user via an interface of the interaction client 706. In this context, "external" refers to the fact that the application 708 or applet is external to the interaction client 706. The external resource is often provided by a third party but may also be provided by the creator or provider of the interaction client 706. The interaction client 706 receives a user selection of an option to launch or access features of such an external resource. The external resource may be the application 708 installed on the XR system 702 (e.g., a "native app"), or a small-scale version of the application (e.g., an "applet") that is hosted on the XR system 702 or remote of the XR system 702 (e.g., on third-party servers 714). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 706. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 706 determines whether the selected external resource is a web-based external resource or a locally installed application 708. In some cases, applications 708 that are locally installed on the XR system 702 can be launched independently of and separately from the interaction client 706, such as by selecting an icon corresponding to the application 708 on a home screen of the XR system 702. Small-scale versions of such applications can be launched or accessed via the interaction client 706 and, in some examples, no or limited portions of the small-scale application can be accessed outside of the interaction client 706. The small-scale application can be launched by the interaction client 706 receiving, from a third-party server 714 for example, a markup-language document associated with the small-scale application and processing such a document.

In response to determining that the external resource is a locally installed application 708, the interaction client 706 instructs the XR system 702 to launch the external resource by executing locally-stored code corresponding to the external resource. In response to determining that the external resource is a web-based resource, the interaction client 706 communicates with the third-party servers 714 (for example) to obtain a markup-language document corresponding to the selected external resource. The interaction client 706 then processes the obtained markup-language document to present the web-based external resource within a user interface of the interaction client 706.

The interaction client 706 can notify a user of the XR system 702, or other users related to such a user (e.g., "friends"), of activity taking place in one or more external resources. For example, the interaction client 706 can provide participants in a conversation (e.g., a chat session) in the interaction client 706 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 706, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 706. The external resource can selectively include different media items in the responses, based on a current context of the external resource.

The interaction client 706 can present a list of the available external resources (e.g., applications 708 or applets) to a user to launch or access a given external resource. This list can be presented in a context-sensitive menu. For example, the icons representing different ones of the application 708 (or applets) can vary based on how the menu is launched by the user (e.g., from a conversation interface or from a non-conversation interface).

Data Architecture

Figure 8:
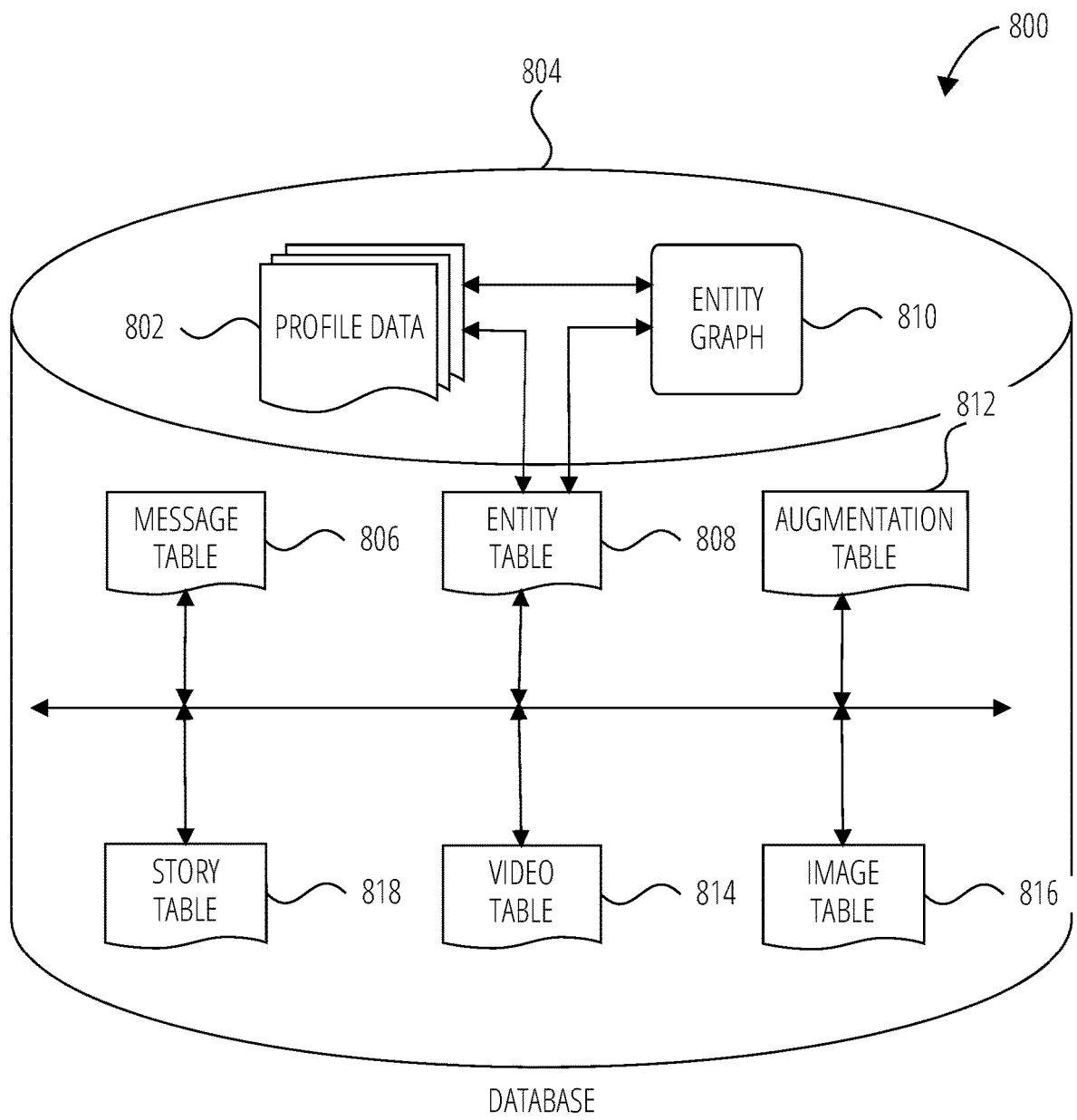
FIG. 8 is a diagrammatic representation of a data structure as maintained in a database, in accordance with some examples.

FIG. 8 is a schematic diagram illustrating data structures 800, which may be stored in the database 804 of the interaction server system 712, according to certain examples. While the content of the database 804 is shown to comprise multiple tables, it will be appreciated that the data could be stored in other types of data structures (e.g., as an object-oriented database).

The database 804 includes message data stored within a message table 806. This message data includes, for any particular message, at least message sender data, message recipient (or receiver) data, and a payload. Further details regarding information that may be included in a message, and included within the message data stored in the message table 806, are described below with reference to FIG. 8.

An entity table 808 stores entity data, and is linked (e.g., referentially) to an entity graph 810 and profile data 802. Entities for which records are maintained within the entity table 808 may include individuals, corporate entities, organizations, objects, places, events, and so forth. Regardless of entity type, any entity regarding which the interaction server system 712 stores data may be a recognized entity. Each entity is provided with a unique identifier, as well as an entity type identifier (not shown).

The entity graph 810 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 700.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 808. Such privacy settings may be applied to all types of relationships within the context of the interaction system 700, or may selectively be applied to only certain types of relationships.

The profile data 802 stores multiple types of profile data about a particular entity. The profile data 802 may be selectively used and presented to other users of the interaction system 700 based on privacy settings specified by a particular entity. Where the entity is an individual, the profile data 802 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 700, and on map interfaces displayed by interaction clients 706 to other users. The collection of avatar representations may include "status avatars," which present a graphical representation of a status or activity that the user may select to communicate at a particular time.

Where the entity is a group, the profile data 802 for the group may similarly include one or more avatar representations associated with the group, in addition to the group name, members, and various settings (e.g., notifications) for the relevant group.

The database 804 also stores augmentation data, such as overlays or filters, in an augmentation table 812. The augmentation data is associated with and applied to videos (for which data is stored in a video table 814) and images (for which data is stored in an image table 816).

Filters, in some examples, are overlays that are displayed as overlaid on an image or video during presentation to a message receiver. Filters may be of various types, including user-selected filters from a set of filters presented to a message sender by the interaction client 706 when the message sender is composing a message. Other types of filters include geolocation filters (also known as geo-filters), which may be presented to a message sender based on geographic location. For example, geolocation filters specific to a neighborhood or special location may be presented within a user interface by the interaction client 706, based on geolocation information determined by a Global Positioning System (GPS) unit of the XR system 702.

Another type of filter is a data filter, which may be selectively presented to a message sender by the interaction client 706 based on other inputs or information gathered by the XR system 702 during the message creation process. Examples of data filters include current temperature at a specific location, a current speed at which a message sender is traveling, battery life for an XR system 702, or the current time.

Other augmentation data that may be stored within the image table 816 includes augmented reality content items (e.g., corresponding to applying Lenses or augmented reality experiences). An augmented reality content item may be a real-time special effect and sound that may be added to an image or a video.

As described above, augmentation data includes AR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the XR system 702 and then displayed on a screen of the XR system 702 with the modifications. This also includes modifications to stored content, such as video clips in a collection or group that may be modified. For example, in an XR system 702 with access to multiple augmented reality content items, a user can use a single video clip with multiple augmented reality content items to see how the different augmented reality content items will modify the stored clip. Similarly, real-time video capture may use modifications to show how video images currently being captured by sensors of an XR system 702 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using XR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the XR system 702) and perform complex image manipulations locally on the XR system 702 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the XR system 702.

In some examples, a computer animation model to transform image data can be used by a system where a user may capture an image or video stream of the user (e.g., a selfie) using the XR system 702 having a neural network operating as part of an interaction client 706 operating on the XR system 702. The transformation system operating within the interaction client 706 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the XR system 702 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 818 stores data regarding collections of messages and associated image, video, or audio data, which are compiled into a collection (e.g., a story or a gallery). The creation of a particular collection may be initiated by a particular user (e.g., each user for which a record is maintained in the entity table 808). A user may create a "personal story" in the form of a collection of content that has been created and sent/broadcast by that user. To this end, the user interface of the interaction client 706 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 706, to contribute content to a particular live story. The live story may be identified to the user by the interaction client 706, based on his or her location. The end result is a "live story" told from a community perspective.

A further type of content collection is known as a "location story," which enables a user whose XR system 702 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 814 stores video data that, in some examples, is associated with messages for which records are maintained within the message table 806. Similarly, the image table 816 stores image data associated with messages for which message data is stored in the entity table 808. The entity table 808 may associate various augmentations from the augmentation table 812 with various images and videos stored in the image table 816 and the video table 814.

The databases 804 also includes social network information collected by the social network system 922.

System Architecture

Figure 9:
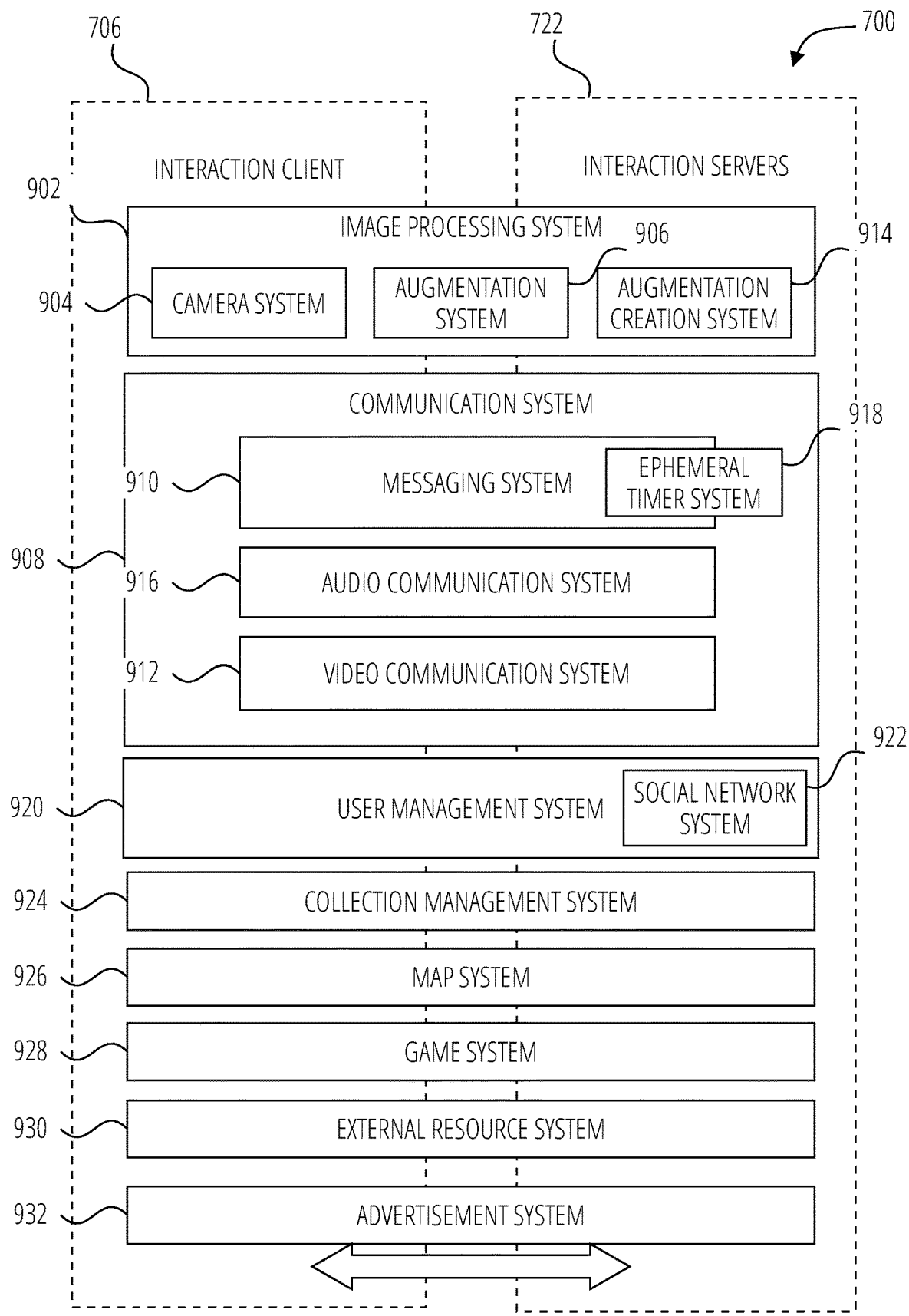
FIG. 9 is a diagrammatic representation of a messaging system that has both client-side and server-side functionality, in accordance with some examples.

FIG. 9 is a block diagram illustrating further details regarding the interaction system 700, according to some examples. Specifically, the interaction system 700 is shown to comprise the interaction client 706 and the interaction servers 722. The interaction system 700 embodies multiple subsystems, which are supported on the client-side by the interaction client 706 and on the server-side by the interaction servers 722. Example subsystems are discussed below.

An image processing system 902 provides various functions that enable a user to capture and augment (e.g., augment or otherwise modify or edit) media content associated with a message.

A camera system 904 includes control software (e.g., in a camera application) that interacts with and controls hardware camera hardware (e.g., directly or via operating system controls) of the XR system 702 to modify and augment real-time images captured and displayed via the interaction client 706.

The augmentation system 906 provides functions related to the generation and publishing of augmentations (e.g., media overlays) for images captured in real-time by cameras of the XR system 702 or retrieved from memory of the XR system 702. For example, the augmentation system 906 operatively selects, presents, and displays media overlays (e.g., an image filter or an image lens) to the interaction client 706 for the augmentation of real-time images received via the camera system 904 or stored images retrieved from memory 602 of an XR system 702. These augmentations are selected by the augmentation system 906 and presented to a user of an interaction client 706, based on a number of inputs and data, such as for example:

Geolocation of the XR system 702; and
Social network information of the user of the XR system 702.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at XR system 702 for communication in a message, or applied to video content, such as a video content stream or feed transmitted from an interaction client 706. As such, the image processing system 902 may interact with, and support, the various subsystems of the communication system 908, such as the messaging system 910 and the video communication system 912.

A media overlay may include text or image data that can be overlaid on top of a photograph taken by the XR system 702 or a video stream produced by the XR system 702. In some examples, the media overlay may be a location overlay (e.g., Venice beach), a name of a live event, or a name of a merchant overlay (e.g., Beach Coffee House). In further examples, the image processing system 902 uses the geolocation of the XR system 702 to identify a media overlay that includes the name of a merchant at the geolocation of the XR system 702. The media overlay may include other indicia associated with the merchant. The media overlays may be stored in the databases 726 and accessed through the database server 724.

The image processing system 902 provides a user-based publication platform that enables users to select a geolocation on a map and upload content associated with the selected geolocation. The user may also specify circumstances under which a particular media overlay should be offered to other users. The image processing system 902 generates a media overlay that includes the uploaded content and associates the uploaded content with the selected geolocation.

The augmentation creation system 914 supports augmented reality developer platforms and includes an application for content creators (e.g., artists and developers) to create and publish augmentations (e.g., augmented reality experiences) of the interaction client 706. The augmentation creation system 914 provides a library of built-in features and tools to content creators including, for example custom shaders, tracking technology, and templates.

In some examples, the augmentation creation system 914 provides a merchant-based publication platform that enables merchants to select a particular augmentation associated with a geolocation via a bidding process. For example, the augmentation creation system 914 associates a media overlay of the highest bidding merchant with a corresponding geolocation for a predefined amount of time.

A communication system 908 is responsible for enabling and processing multiple forms of communication and interaction within the interaction system 700 and includes a messaging system 910, an audio communication system 916, and a video communication system 912. The messaging system 910 is responsible for enforcing the temporary or time-limited access to content by the interaction clients 706. The messaging system 910 incorporates multiple timers (e.g., within an ephemeral timer system 918) that, based on duration and display parameters associated with a message or collection of messages (e.g., a story), selectively enable access (e.g., for presentation and display) to messages and associated content via the interaction client 706. Further details regarding the operation of the ephemeral timer system 918 are provided below. The audio communication system 916 enables and supports audio communications (e.g., real-time audio chat) between multiple interaction clients 706. Similarly, the video communication system 912 enables and supports video communications (e.g., real-time video chat) between multiple interaction clients 706.

A user management system 920 is operationally responsible for the management of user data and profiles, and includes a social network system 922 that maintains social network information regarding relationships between users of the interaction system 700.

A collection management system 924 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 924 may also be responsible for publishing an icon that provides notification of a particular collection to the user interface of the interaction client 706. The collection management system 924 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 924 employs machine vision (or image recognition technology) and content rules to curate a content collection automatically. In certain examples, compensation may be paid to a user to include user-generated content into a collection. In such cases, the collection management system 924 operates to automatically make payments to such users to use their content.

A map system 926 provides various geographic location functions and supports the presentation of map-based media content and messages by the interaction client 706. For example, the map system 926 enables the display of user icons or avatars (e.g., stored in profile data 802) on a map to indicate a current or past location of "friends" of a user, as well as media content (e.g., collections of messages including photographs and videos) generated by such friends, within the context of a map. For example, a message posted by a user to the interaction system 700 from a specific geographic location may be displayed within the context of a map at that particular location to "friends" of a specific user on a map interface of the interaction client 706. A user can furthermore share his or her location and status information (e.g., using an appropriate status avatar) with other users of the interaction system 700 via the interaction client 706, with this location and status information being similarly displayed within the context of a map interface of the interaction client 706 to selected users.

A game system 928 provides various gaming functions within the context of the interaction client 706. The interaction client 706 provides a game interface providing a list of available games that can be launched by a user within the context of the interaction client 706 and played with other users of the interaction system 700. The interaction system 700 further enables a particular user to invite other users to participate in the play of a specific game by issuing invitations to such other users from the interaction client 706. The interaction client 706 also supports audio, video, and text messaging (e.g., chats) within the context of gameplay, provides a leaderboard for the games, and also supports the provision of in-game rewards (e.g., coins and items).

An external resource system 930 provides an interface for the interaction client 706 to communicate with remote servers (e.g., third-party servers 714) to launch or access external resources, i.e., applications or applets. Each third-party server 714 hosts, for example, a markup language (e.g., HTML5) based application or a small-scale version of an application (e.g., game, utility, payment, or ride-sharing application). The interaction client 706 may launch a web-based resource (e.g., application) by accessing the HTML5 file from the third-party servers 714 associated with the web-based resource. Applications hosted by third-party servers 714 are programmed in JavaScript leveraging a Software Development Kit (SDK) provided by the interaction servers 722. The SDK includes Application Programming Interfaces (APIs) with functions that can be called or invoked by the web-based application. The interaction servers 722 host a JavaScript library that provides a given external resource access to specific user data of the interaction client 706. HTML5 is an example of technology for programming games, but applications and resources programmed based on other technologies can be used.

To integrate the functions of the SDK into the web-based resource, the SDK is downloaded by the third-party server 714 from the interaction servers 722 or is otherwise received by the third-party server 714. Once downloaded or received, the SDK is included as part of the application code of a web-based external resource. The code of the web-based resource can then call or invoke certain functions of the SDK to integrate features of the interaction client 706 into the web-based resource.

The SDK stored on the interaction server system 712 effectively provides the bridge between an external resource (e.g., applications 708 or applets) and the interaction client 706. This gives the user a seamless experience of communicating with other users on the interaction client 706 while also preserving the look and feel of the interaction client 706. To bridge communications between an external resource and an interaction client 706, the SDK facilitates communication between third-party servers 714 and the interaction client 706. A WebViewJavaScriptBridge running on an XR system 702 establishes two one-way communication channels between an external resource and the interaction client 706. Messages are sent between the external resource and the interaction client 706 via these communication channels asynchronously. Each SDK function invocation is sent as a message and callback. Each SDK function is implemented by constructing a unique callback identifier and sending a message with that callback identifier.

By using the SDK, not all information from the interaction client 706 is shared with third-party servers 714. The SDK limits which information is shared based on the needs of the external resource. Each third-party server 714 provides an HTML5 file corresponding to the web-based external resource to interaction servers 722. The interaction servers 722 can add a visual representation (such as a box art or other graphic) of the web-based external resource in the interaction client 706. Once the user selects the visual representation or instructs the interaction client 706 through a GUI of the interaction client 706 to access features of the web-based external resource, the interaction client 706 obtains the HTML5 file and instantiates the resources to access the features of the web-based external resource.

The interaction client 706 presents a graphical user interface (e.g., a landing page or title screen) for an external resource. During, before, or after presenting the landing page or title screen, the interaction client 706 determines whether the launched external resource has been previously authorized to access user data of the interaction client 706. In response to determining that the launched external resource has been previously authorized to access user data of the interaction client 706, the interaction client 706 presents another graphical user interface of the external resource that includes functions and features of the external resource. In response to determining that the launched external resource has not been previously authorized to access user data of the interaction client 706, after a threshold period of time (e.g., 3 seconds) of displaying the landing page or title screen of the external resource, the interaction client 706 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 706 adds the external resource to a list of authorized external resources and allows the external resource to access user data from the interaction client 706. The external resource is authorized by the interaction client 706 to access the user data under an OAuth 2 framework.

The interaction client 706 controls the type of user data that is shared with external resources based on the type of external resource being authorized. For example, external resources that include full-scale applications (e.g., an application 708) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 932 operationally enables the purchasing of advertisements by third parties for presentation to end-users via the interaction clients 706 and also handles the delivery and presentation of these advertisements.

Software Architecture

Figure 10:
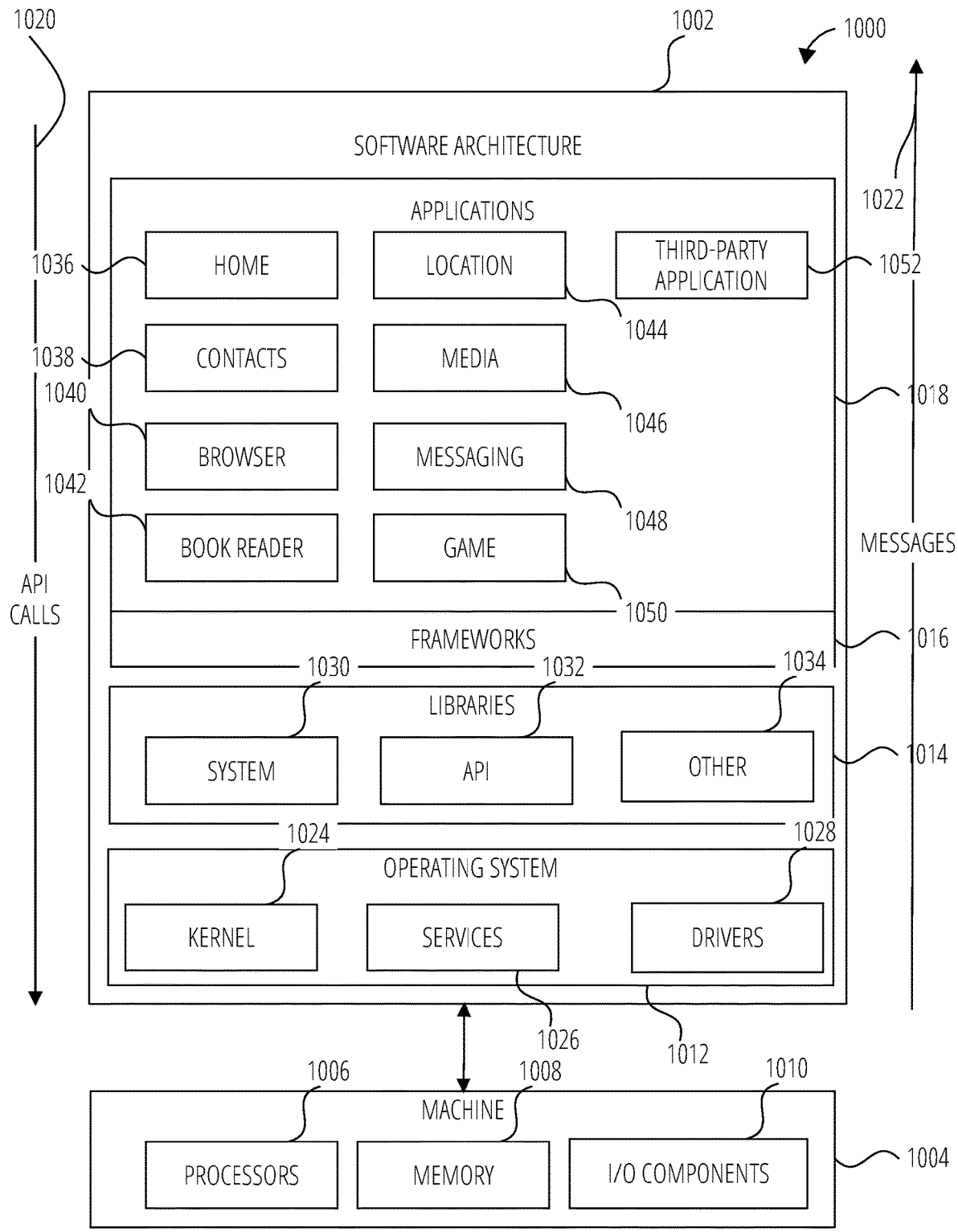
FIG. 10 is a block diagram showing a software architecture, in accordance with some examples.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
    receiving, by one or more processors of an extended Reality (XR) system, a request to initiate a spatial scan of a real-world scene;
    capturing, by the one or more processors, using one or more cameras of the XR system, video frame data of the real-world scene;
    capturing, by the one or more processors, using a pose tracking component of the XR system, a pose of the XR system;
    detecting, by the one or more processors, a physical object in the real-world scene and determining a two-dimensional (2D) position of the physical object, using the video frame data;
    determining, by the one or more processors, a depth of the physical object using the 2D position; and
    determining, by the one or more processors, a three-dimensional (3D) position of the physical object in the real-world scene using the 2D position of the physical object, the depth of the physical object, and the pose of the XR system.

2. The computer-implemented method of claim 1, further comprising communicating the 3D position of the physical object to an application of the XR system.

3. The computer-implemented method of claim 2, further comprising generating a label for the physical object.

4. The computer-implemented method of claim 1, wherein detecting the physical object and determining the 2D position of the physical object comprises detecting the physical object based on artificial intelligence methodologies using an object identification model.

5. The computer-implemented method of claim 1, wherein determining the 3D position of the physical object comprises:
    generating a geometric ray using a point of view of a user using the XR system and the 2D position of the physical object; and determining the 3D position of the physical object using an intersection between the geometric ray and the physical object.

6. The computer-implemented method of claim 1, wherein the XR system comprises a head-wearable apparatus.

7. The computer-implemented method of claim 1, wherein the XR system comprises a mobile device.

8. A machine comprising:
one or more processors; and
a memory storing instructions that, when executed by the one or more processors, cause the machine to perform operations comprising:
receiving a request to initiate a spatial scan of a real-world scene;
capturing using one or more cameras of an extended Reality (XR) system, video frame data of the real-world scene;
capturing, using a pose tracking component of the XR system, a pose of the XR system;
detecting a physical object in the real-world scene and determining a 2D position of the physical object, using the video frame data;
determining a depth of the physical object using the 2D position; and
determining a 3D position of the physical object in the real-world scene using the 2D position of the physical object, the depth of the physical object, and the pose of the XR system.

9. The machine of claim 8, wherein the operations further comprise communicating the 3D position of the physical object to an application of the XR system.

10. The machine of claim 9, wherein the operations further comprise generating a label for the physical object.

11. The machine of claim 8, wherein detecting the physical object and determining the 2D position of the physical object comprises detecting the physical object based on artificial intelligence methodologies using an object identification model.

12. The machine of claim 8, wherein determining the 3D position of the physical object comprises:
generating a geometric ray using a point of view of a user using the XR system and the 2D position of the physical object; and
determining the 3D position of the physical object using an intersection between the geometric ray and the physical object.

13. The machine of claim 8, wherein the XR system comprises a head-wearable apparatus.

14. The machine of claim 8, wherein the XR system comprises a mobile device.

15. A non-transitory machine-readable storage medium, the machine-readable storage medium including instructions that, when executed by a machine, cause the machine to perform operations comprising:
receiving a request to initiate a spatial scan of a real-world scene;
capturing using one or more cameras of an extended Reality (XR) system, video frame data of the real-world scene;
capturing, using a pose tracking component of the XR system, a pose of the XR system;
detecting a physical object in the real-world scene and determining a 2D position of the physical object, using the video frame data;
determining a depth of the physical object using the 2D position; and
determining a 3D position of the physical object in the real-world scene using the 2D position of the physical object, the depth of the physical object, and the pose of the XR system.

16. The non-transitory machine-readable storage medium of claim 15, wherein the operations further comprise communicating the 3D position of the physical object to an application of the XR system.

17. The non-transitory machine-readable storage medium of claim 16, wherein the operations further comprise generating a label for the physical object.

18. The non-transitory machine-readable storage medium of claim 15, wherein detecting the physical object and determining the 2D position of the physical object comprises detecting the physical object based on artificial intelligence methodologies using an object identification model.

19. The non-transitory machine-readable storage medium of claim 15, wherein determining the 3D position of the physical object comprises:
generating a geometric ray using a point of view of a user using the XR system and the 2D position of the physical object; and
determining the 3D position of the physical object using an intersection between the geometric ray and the physical object.

20. The non-transitory machine-readable storage medium of claim 15, wherein the XR system comprises a head-wearable apparatus.

* * * * *